United States Patent
Farnsworth et al.

(10) Patent No.: US 11,756,531 B1
(45) Date of Patent: Sep. 12, 2023

(54) TECHNIQUES FOR AUDIO DETECTION AT A CONTROL SYSTEM

(71) Applicant: Vivint, Inc., Provo, UT (US)

(72) Inventors: Anthony Farnsworth, Alpine, UT (US); J. Robert Lee, Provo, UT (US); Jared Bruton, Orem, UT (US); Stephen Sainsbury, Lehi, UT (US)

(73) Assignee: VIVINT, INC., Provo, UT (US)

( * ) Notice: Subject to any disclaimer, the term of this patent is extended or adjusted under 35 U.S.C. 154(b) by 149 days.

(21) Appl. No.: 17/127,552

(22) Filed: Dec. 18, 2020

(51) Int. Cl.
*G10L 15/08* (2006.01)
*G08B 21/02* (2006.01)
*G08B 13/00* (2006.01)
*G10L 15/22* (2006.01)

(52) U.S. Cl.
CPC .............. *G10L 15/08* (2013.01); *G08B 13/00* (2013.01); *G08B 21/02* (2013.01); *G10L 15/22* (2013.01)

(58) Field of Classification Search
CPC ......... G10L 15/08; G10L 15/22; G08B 13/00; G08B 21/02
See application file for complete search history.

(56) References Cited

U.S. PATENT DOCUMENTS

| | | | |
|---|---|---|---|
| 7,015,807 B2 | 3/2006 | Roby et al. | |
| 7,477,144 B2 | 1/2009 | Albert | |
| 8,085,147 B2 | 12/2011 | Marriam et al. | |
| 9,202,363 B1 | 12/2015 | Grant | |
| 9,568,902 B2 | 2/2017 | Dunn et al. | |
| 9,619,985 B2 | 4/2017 | Stricker et al. | |
| 10,026,304 B2 | 7/2018 | Taylor et al. | |
| 10,163,329 B1* | 12/2018 | Jensen | G08B 25/002 |
| 10,558,917 B2 | 2/2020 | Locke et al. | |
| 10,642,233 B2 | 5/2020 | Ramakrishnappa et al. | |
| 10,796,547 B1 | 10/2020 | Simpson et al. | |
| 11,138,858 B1* | 10/2021 | Segal | G10L 15/22 |
| 2015/0221321 A1* | 8/2015 | Christian | G10L 25/48 700/94 |
| 2017/0309142 A1* | 10/2017 | Phillips | G08B 13/1672 |
| 2018/0114430 A1 | 4/2018 | Westmacott et al. | |
| 2021/0407494 A1* | 12/2021 | Gao | G10L 15/08 |
| 2022/0139371 A1* | 5/2022 | Sharifi | G01S 3/8006 704/231 |
| 2022/0180730 A1* | 6/2022 | Saldin | H04L 63/20 |

\* cited by examiner

*Primary Examiner* — Stella L. Woo
(74) *Attorney, Agent, or Firm* — Kunzler Bean & Adamson

(57) ABSTRACT

Methods, systems, and devices for audio detection are described. A security and automation system may include a control system that includes a hub device and one or more user interfaces. The control system is configured to receive, at a microphone included in the control system, an audio signal from a zone within the premises. In some examples, the control system may be configured to communicate with nodes of the security and automation system using one or more wireless access technologies and one or more wired access technologies. The control system may determine, at a first processor of the control system, that a set of characteristics of the audio signal satisfies a threshold. The control system may transmit a notification of an event in the zone of the premises based on determining that the set of characteristics of the audio signal satisfies the threshold.

20 Claims, 11 Drawing Sheets

TECHNIQUES FOR AUDIO DETECTION AT A CONTROL SYSTEM

BACKGROUND

The present disclosure, for example, relates to security and automation systems, and more particularly to techniques for audio detection at a control system in security and automation systems.

Security and automation systems are widely deployed in environments (e.g., a residential, a commercial, or an industrial setting) to provide various types of communication and functional features such as monitoring, communication, notification, and/or others. These systems may be capable of supporting communication with a person through a communication connection or a system management action.

Present security and automation system may include one or more sensors for monitoring a home or a commercial business. These systems typically employ sensors at entry and exit points, along with interior sensors (e.g., motion detectors, sound sensors, and glass break sensors) for determining entry or exit into or out of a property. Although some techniques related to security may provide for determining an alarm event, these techniques may be inefficient and may use additional hardware. In some cases, the additional hardware may be battery-powered (which may cause additional maintenance of the security and automation system) or the additional hardware may be coupled with the power of the premises (which may create additional installation costs for the security and automation system). Specifically, as home automation and security products expand in functionality in a home, opportunities exist for providing improved audio detection at a control system and automated control upon detecting events.

SUMMARY

The described techniques relate to improved methods, systems, devices, and apparatuses that support techniques for audio detection. Generally, the described techniques provide for enabling a security and automation system to detect an alarm event and monitor a zone of a premises. In some examples, a control system of a security and automation system may receive, at a microphone included in a device of the control system, an audio signal from a zone within a premises. The control system may of the security and automation system may include one or more devices, including a control hub and one or more user interfaces. Upon receiving the audio signal, the control system may determine a set of characteristics associated with the audio signal. In some examples, the control system may determine that the audio signal originates from a sensor positioned in the premises based on the determined characteristics. In some examples, the control system may determine that the audio signal is associated with a life-safety event. In an example where the control system detects a life-safety event, the control system may transmit the notification to an emergency personnel. Additionally or alternatively, the control system may detect a presence of a person in a zone of the premises, for example using the camera, a motion sensor, or another sensor. The control system may generate a notification (e.g. an audiovisual notification) based on determining the presence of a person in a zone of the premises.

A method for audio detection at a security and automation system associated with a premises is described. The method may be performed by a computing device including at least one processor. The method may include receiving, at a microphone included in a control system of the security and automation system, an audio signal from a zone within the premises, the control system configured to communicate with nodes of the security and automation system using one or more wireless access technologies and one or more wired access technologies, determining, at a first processor of the control system, that a set of characteristics of the audio signal satisfies a threshold, and transmitting a notification of an event in the zone of the premises based on determining that the set of characteristics of the audio signal satisfies the threshold.

An apparatus for audio detection at a security and automation system associated with a premises is described. The apparatus may include a processor, memory coupled with the processor, and instructions stored in the memory. The instructions may be executable by the processor to cause the apparatus to receive, at a microphone included in a control system of the security and automation system, an audio signal from a zone within the premises, the control system configured to communicate with nodes of the security and automation system using one or more wireless access technologies and one or more wired access technologies, determine, at a first processor of the control system, that a set of characteristics of the audio signal satisfies a threshold, and transmit a notification of an event in the zone of the premises based on determining that the set of characteristics of the audio signal satisfies the threshold.

A non-transitory computer-readable medium storing code is described. The code may include instructions executable by a processor of a security and automation system to receive, at a microphone included in a control system of the security and automation system, an audio signal from a zone within the premises, the control system configured to communicate with nodes of the security and automation system using one or more wireless access technologies and one or more wired access technologies, determine, at a first processor of the control system, that a set of characteristics of the audio signal satisfies a threshold, and transmit a notification of an event in the zone of the premises based on determining that the set of characteristics of the audio signal satisfies the threshold.

Some examples of the method, apparatus, and non-transitory computer-readable medium described herein may further include operations, features, means, or instructions for determining, at a second processor, that a second set of characteristics of the audio signal satisfies an event threshold based on determining that the set of characteristics satisfies the threshold, where transmitting the notification of the event is further based on determining that the second set of characteristics of the audio signal satisfies the event threshold, the second processor including a processor of a server in electronic communication with the control system using the one or more wireless access technologies or the one or more wired access technologies.

Some examples of the method, apparatus, and non-transitory computer-readable medium described herein may further include operations, features, means, or instructions for determining that the audio signal originates from a sensor positioned in the premises based on determining that the second set of characteristics satisfies the event threshold, and determining a type of the event detected by the sensor based on the second set of characteristics associated with the audio signal, where transmitting the notification is based on the type of the event.

Some examples of the method, apparatus, and non-transitory computer-readable medium described herein may further include operations, features, means, or instructions for determining that the audio signal is an alarm output by a smoke detector positioned in the premises, the sensor including the smoke detector, where transmitting the notification includes transmitting a life-safety alert based on determining that the audio signal is the alarm output by the smoke detector.

In some examples of the method, apparatus, and non-transitory computer-readable medium described herein, the processor of the control system includes a codec associated with the microphone.

Some examples of the method, apparatus, and non-transitory computer-readable medium described herein may further include operations, features, means, or instructions for setting, by the control system of the security and automation system, one or more monitoring thresholds to cause at least one node of the security and automation system to initiate a recording of the audio signal when at least one of the one or more monitoring thresholds is satisfied, and communicating the one or more monitoring thresholds to the nodes of the security and automation system using the one or more wireless access technologies and the one or more wired access technologies, where receiving the audio signal includes receiving the audio signal from the at least one node.

Some examples of the method, apparatus, and non-transitory computer-readable medium described herein may further include operations, features, means, or instructions for detecting, by a sensor, a presence of a person within a threshold distance of the premises based on monitoring the premises, determining an action to take at the security and automation system based on detecting the presence of the person, and initiating the action at one or more devices associated with the security and automation system.

Some examples of the method, apparatus, and non-transitory computer-readable medium described herein may further include operations, features, means, or instructions for detecting, by the sensor, at least one of an audio activity or a motion associated with the person within the premises based on the monitoring, identifying one or more characteristics of the presence based on detecting at least one of the audio activity or the motion, and determining a type of event at the premises based on the one or more characteristics of the presence, where the action is determined based on the type of event.

In some examples of the method, apparatus, and non-transitory computer-readable medium described herein, the type of event includes a life-safety event, a security event, or an occupancy event, or a combination thereof, and the action includes a reporting action or a deterrence action or both.

Some examples of the method, apparatus, and non-transitory computer-readable medium described herein may further include operations, features, means, or instructions for detecting, by the sensor, a motion associated with the person within the premises based on the monitoring, and determining a location of the motion associated with the person based on detecting the motion, where transmitting the notification of the event in the zone of the premises includes transmitting the location of the motion.

In some examples of the method, apparatus, and non-transitory computer-readable medium described herein, the one or more devices may include at least one of a node of the security and automation system, a communication interface of the security and automation system, a remote device associated with an occupant of the premises, a device associated with a network operations center, a device associated with an emergency response provider, or any combination thereof.

Some examples of the method, apparatus, and non-transitory computer-readable medium described herein may further include operations, features, means, or instructions for determining that the security and automation system is operating in a first mode, detecting the event at the premises based on monitoring the premises, and determining the action to take at the security and automation system based on detecting the event and determining that the security and automation system is operating in the first mode.

Some examples of the method, apparatus, and non-transitory computer-readable medium described herein may further include operations, features, means, or instructions for determining a loss of power at the control system of the security and automation system, and activating a back-up power source based on determining the loss of power at the control system, where receiving the audio signal from the zone within the premises is based on activating the back-up power source.

Some examples of the method, apparatus, and non-transitory computer-readable medium described herein may further include operations, features, means, or instructions for receiving, from at least a user, a response to the notification, and performing an action based on receiving the response.

In some examples of the method, apparatus, and non-transitory computer-readable medium described herein, the notification includes a written message, a tone, a spoken announcement, an activation of a light, a flashing pattern of the light, a verbal message, or any combination thereof, and the response includes at least one of a command, a text message, a confirmation message, the verbal message, or any combination thereof.

Some examples of the method, apparatus, and non-transitory computer-readable medium described herein may further include operations, features, means, or instructions for determining that the audio signal includes at least one of a signal originating from at least one of glass break, human speech, footsteps, interaction with a door, interaction with a window, running water, or any combination thereof, a signal originating from a sensor positioned in the premises, where the sensor comprises a smoke detection sensor, a carbon monoxide detection sensor, a camera sensor, a motion sensor, an occupancy sensor, a doorbell, a light, or any combination thereof.

Some examples of the method, apparatus, and non-transitory computer-readable medium described herein may further include operations, features, means, or instructions for transmitting, to a central monitoring agency, a second notification indicating a life-safety alert based on determining that the set of characteristics of the audio signal satisfies the threshold.

DETAILED DESCRIPTION

Figure 1:
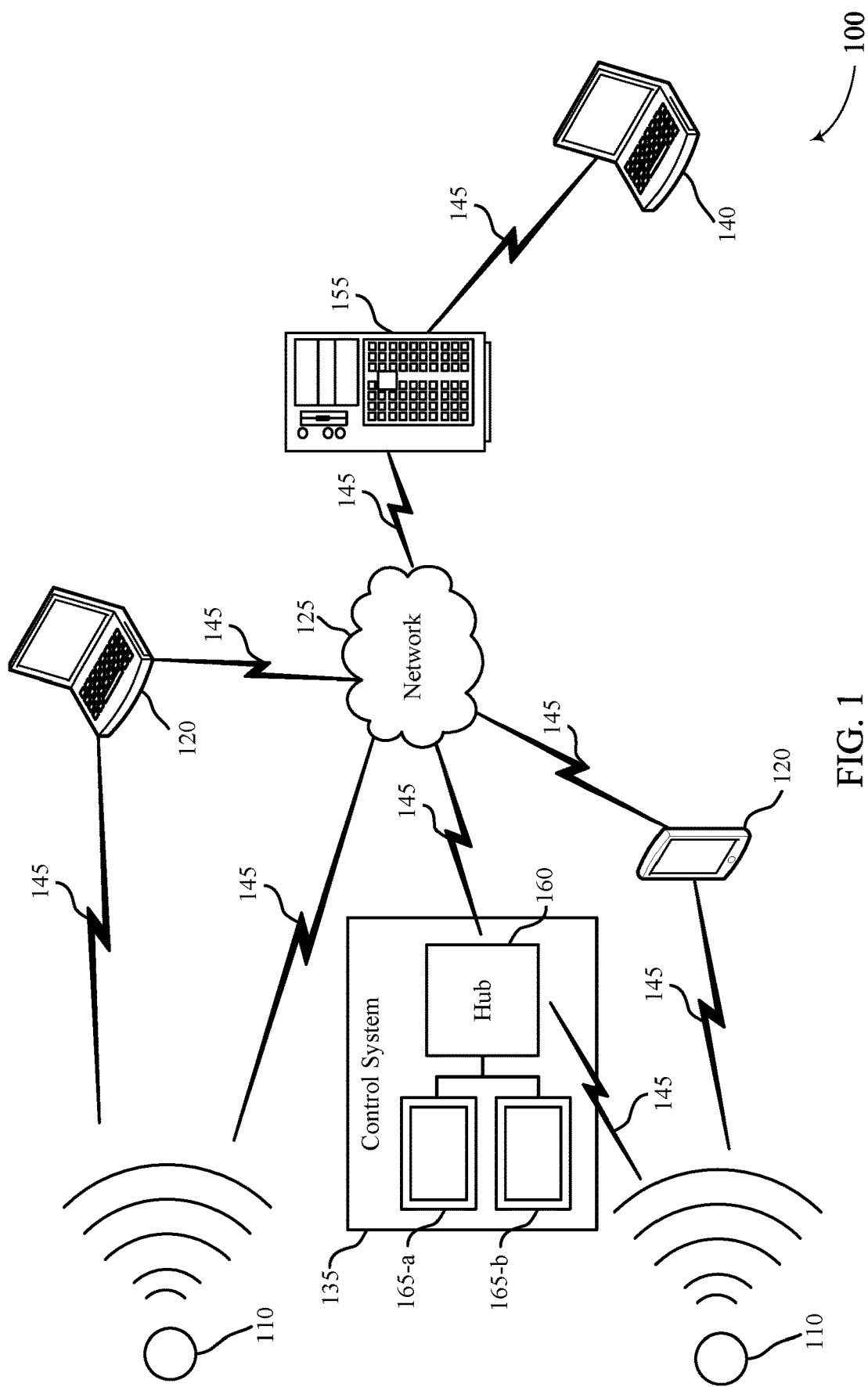
FIG. 1 illustrates an example of a system that supports techniques for audio detection at a control system in accordance with aspects of the present disclosure.

Security and automation systems are used in a variety of premises, e.g., for homes and commercial businesses, and have become commonplace as people seek to guard themselves and their property. These security and automation systems may employ sensors at entry and exit points, along with interior sensors (e.g., motion detectors, sound sensors, and glass break sensors) for determining entry or exit into or out of a property. In addition, these security and automation systems may employ security cameras that perform various operations related to crime or other circumstances. More specifically, the systems and methods described herein relate to detecting alarm events at a premises. Additionally or alternatively, the systems and methods described herein may provide for controlling access to a premises based on identifying one or more intruders. The term "premises" or "home" used throughout this document generically refers to any dwelling or property that is monitored by a monitoring system such as an automation system and/or a security system. A security and automation system may include automation and security features. Some methods for detecting alarm events associated with a motion sensor may have several drawbacks, such as for example using additional communications between an authorized user and an unauthorized user. In addition, some methods for detecting alarm events associated with a smoke detector, a carbon monoxide detector or a glass break may include installation of an additional hardware for alarm detection. The term "security and automation system" may be used herein to describe a security system, an automation system, a smart home security and/or automation system, which may provide automation and/or security functionality.

Systems, devices, and techniques for alarm event detection at a premises using a control system of a security and automation system are described. In some examples, a control system may receive, at a microphone included in a device of the control system of the security and automation system at a premises, an audio signal from a zone within the premises. The control system may of the security and automation system may include one or more devices, including a control hub and one or more user interfaces. The control system may be configured to communicate with nodes of the security and automation system using one or more wireless access technologies and one or more wired access technologies. Upon receiving the audio signal, the control system may determine a set of characteristics associated with the audio signal. In some examples, the control system may determine that the set of characteristics of the audio signal satisfies a threshold. For instance, the control system may determine that the audio signal originates from a sensor positioned in the premises. The control system may determine that the sensor is a smoke alarm or a carbon monoxide alarm. In some examples, the control system may determine that the audio signal is associated with a glass break event. In such cases, the control system may designate the audio signal to be associated with a life-safety event. In some examples, the control system may transmit a notification of an event in the zone of the premises based on determining that the set of characteristics of the audio signal satisfies the threshold. In an example where the control system detects a life-safety event, the control system may transmit the notification to an emergency personnel.

In some cases, sensors of a security and automation system may be configured to monitor a zone of the premises. For example, a camera may be mounted such that the camera may capture images of rooms, a driveway, a yard, a porch, etc. The camera may include or be in communication with a motion sensor for detecting movement within the zone. According to some aspects of the present disclosure, the system and methods can be implemented to perform tasks that are responsive to the detected movement. For example, upon detecting movement, the camera (or the control system of the security and automation system at the premises) may be configured to analyze the movement data to determine whether the movement is associated with an intrusion event. Additionally or alternatively, a motion sensor may be configured to distinguish between a person and movements of other objects (e.g., cars, animals, etc.).

Aspects of the disclosure are initially described in the context of security and automation systems. Aspects of the disclosure are further illustrated by and described with reference to security and automation environments and a process flow. Aspects of the disclosure are further illustrated by and described with reference to apparatus diagrams, system diagrams, and flowcharts that relate to techniques for audio detection.

The following description provides examples and is not limiting of the scope, applicability, and/or examples set forth in the claims. Changes may be made in the function and/or arrangement of elements discussed without departing from the scope of the disclosure. Various examples may omit, substitute, and/or add various procedures and/or components as appropriate. For instance, the methods described may be performed in an order different from that described, and/or various steps may be added, omitted, and/or combined. Also, features described with respect to some examples may be combined in other examples.

FIG. 1 illustrates an example of a system 100 that supports techniques for audio detection at a control system in accordance with aspects of the present disclosure. The system 100 may be an example of a security and automation system. The system 100 may include one or more sensor units 110, one or more local computing devices 120, control system 135, remote computing device 140, and server 155. The network 125 may provide personal authentication credentials, encryption, access authorization, tracking, Internet Protocol (IP) connectivity, and other access, computation, modification, and/or functions.

The control system 135 may be positioned at the premises and may be configured to interface with the network 125 and/or other components of the system 100 (e.g., the security and automation system). the control system 135 may include one or more user interfaces 165 (such as user interface 165-*a* and user interface 165-*b*) and one or more hub devices 160. The hub device 160 may configured to communicate with various components using one or more wired communication links and/or one or more wireless communication links such that the hub device 160 may facilitate communication between components of the system 100 at the premises and may facilitate communication devices that are external to the premises (e.g., server 155) using its plurality of communication link capabilities. For example, the hub device 160 may be configured to communicate using Ethernet, dial-up, fiber optic links, Wi-Fi (or its many derivatives), Bluetooth, 3G, 4G, 5G, Zigbee, Z-wave, other communication protocols, or any combination thereof. In some cases, the hub device 160 may include a processor and memory to perform various algorithms on data that pass through the hub device 160.

The control system 135 may also include one or more user interfaces 165 distributed throughout the premises. The one or more user interfaces 165 may include components to receive inputs from a user and components to provide outputs to a user. Examples of input devices at a user interface 165 may include a touchpad, a touchscreen, a keyboard, a mouse, a keypad, or other input device to receive tactile input from the user, or may include a microphone to receive audio input from a user, or may include a camera to receive visual inputs from a user, or any combination thereof. Examples output devices may include a screen or speakers. In some examples, a hub 160 may include a user interface 165. In such examples, a single device may serve as both the hub device 160 and a user interface 165 and the control system 135 may have one or more additional user interfaces 165 in the premises. The user interfaces 165 may be configured to communicate with the network using wired communication links or wireless communications, or combinations thereof (e.g., using the network 125, in some cases). In some examples, the control system 135 may be referred to as a control panel or the user interface may be referred to as a control panel.

The control system 135 may interface with the network 125 through a first set of wired and/or wireless communication links 145 to communicate with the server 155. The control system 135 may perform communication configuration, adjustment, and/or scheduling for communication with the local computing device 120 and remote computing device 140, or may operate under the control of a controller. Control system 135 may communicate with a back-end server (such as the server 155)—directly and/or indirectly—using the first set of one or more wireless communication links 145. In some examples, the server 155 may be a remote server located at a location different or same from the control system 135, the local computing device 120, and/or the remote computing device 140.

The control system 135 may wirelessly communicate with the remote computing device 140 and the local computing device 120 by way of one or more antennas (e.g., in the hub device 160). The control system 135 (e.g., the hub device 160) may provide communication coverage for a respective coverage area at the premises (e.g., residential, commercial). In some examples, the control system 135 (e.g., the hub device 160) may be referred to as a control device, a controller, a base transceiver station, a radio base station, an access point, a radio transceiver, or some other suitable terminology. The coverage area for a control system 135 may be divided into sectors making up a portion of the coverage area. The security and automation system 100 may include control systems of different types. In some examples, the security and automation system 100 may include overlapping coverage areas for one or more different parameters, including different technologies, features, subscriber preferences, hardware, software, technology, and/or methods.

For example, one or more control systems may be related to one or more discrete structures (e.g., a house, a business) and each of the one more discrete structures may be related to one or more discrete areas (e.g., multiple houses in a neighborhood). In other examples, multiple control systems may be related to the same one or more discrete structures (e.g., multiple control systems relating to a house and/or a business complex). For example, one or more control systems may be located within a house. Additionally or alternatively, each room within the house may have a designated control system located within each room. In some cases, the one or more control systems may communicate with one another via one or more communication protocols. In some examples, the one or more control systems may form a mesh network at the premises and communicate with one another via the mesh network. In some examples, a control system may modify or update a security parameter based on information received from one or more other control systems in the mesh network.

The local computing device 120 or remote computing device 140 may be dispersed throughout the security and automation system 100. In some examples, the local computing device 120 and/or remote computing device 140 may be stationary and/or mobile. In some examples, the local computing device 120 and/or remote computing device 140 may include a cellular phone, a personal digital assistant (PDA), a wireless modem, a wireless communication device, a handheld device, a tablet computer, a laptop computer, a cordless phone, a wireless local loop (WLL) station, a display device (e.g., TVs, computer monitors), a printer, a camera, and/or the like. The local computing device 120 and/or remote computing device 140 may, additionally or alternatively, include or be referred to as a user device, a smartphone, a BLUETOOTH® device, a Wi-Fi device, a mobile station, a subscriber station, a mobile unit, a subscriber unit, a wireless unit, a remote unit, a mobile device, a wireless device, a wireless communications device, a remote device, an access terminal, a mobile terminal, a wireless terminal, a remote terminal, a handset, a user agent, a mobile client, a client, and/or some other suitable terminology.

In some examples, control system 135 may be a smart home system panel, for example, an interactive panel mounted on a wall or other surface in a person's home. Additionally or alternatively, the control system 135 may be a hub (wired or wireless) in communication with the smart home system panel. Control system 135 may be in direct communication via wired or wireless communication links 145 with the one or more sensor units 110, or may receive sensor data from the one or more sensor units 110 via local computing device 120 and network 125, or may receive data via remote computing device 140, server 155, and network 125. Additionally or alternatively, the control system 135 may wirelessly communicate with the sensor units 110 via one or more antennas. The sensor units 110 may be dispersed throughout the security and automation system 100 and each sensor unit 110 may be stationary and/or mobile. Sensor units 110 may include and/or be one or more sensors that sense: proximity, motion, temperatures, humidity, sound level, smoke, structural features (e.g., glass breaking, window position, door position), time, light, geo-location data of a person and/or a device, distance, biometrics, weight, speed, height, size, preferences, light, darkness, weather, time, system performance, and/or other inputs that relate to a security and/or an automation system.

The local computing device 120, remote computing device 140, and/or a sensor units 110 may be able to communicate through one or more wired and/or wireless connections with various components such as a control system, base stations, and/or network equipment (e.g., servers, wireless communication points) and/or the like. In some examples, one or more sensor units 110 may be located within a structure, e.g., house. Additionally or alternatively, in some examples, the structure may have a designated sensor unit located within one or more predetermined areas, e.g., rooms. In some cases, the one or more sensor units 110 may communicate with one another via one or more communication protocols. In some examples, the one or more sensor units 110 may form a mesh network within the structure and communicate with one another via the mesh network. In some examples, the mesh network associated with the sensor units 110 may be different or be a part of a mesh network associated with one or more control systems.

The wireless communication links 145 shown in the security and automation system 100 may include uplink transmissions from a local computing device 120 to a control system 135, and/or downlink transmissions, from a control system 135 to the local computing device 120. The downlink transmissions may also be called forward link transmissions while the uplink transmissions may also be called reverse link transmissions. Wireless communication links 145 may include one or more carriers, where each carrier may be a signal made up of multiple sub-carriers (e.g., waveform signals of different frequencies) modulated according to the various radio technologies. Each modulated signal may be sent on a different sub-carrier and may carry control information (e.g., reference signals, control channels), overhead information, user data, etc. The wireless communication links 145 may transmit bidirectional communications and/or unidirectional communications. Wireless communication links 145 may include one or more connections, including but not limited to, 345 MHz, Wi-Fi, BLUETOOTH®, BLUETOOTH® Low Energy, cellular, Z-WAVE®, 802.11, peer-to-peer, LAN, wireless local area network (WLAN), Ethernet, FireWire®, fiber optic, and/or other connection types related to security and/or automation systems.

In some examples, of the security and automation system 100, control system 135, local computing device 120, and/or remote computing device 140 may include one or more antennas for employing antenna diversity schemes to improve communication quality and reliability between control system 135, local computing device 120, and remote computing device 140. Additionally or alternatively, control system 135, local computing device 120, and/or remote computing device 140 may employ multiple-input, multiple-output (MIMO) techniques that may take advantage of multi-path, mesh-type environments to transmit multiple spatial layers carrying the same or different coded data.

While the local computing device 120 and/or remote computing device 140 may communicate with each other through the control system 135 (e.g., the hub device 160) using wireless communication links 145, the local computing device 120 and/or remote computing device 140 may also communicate directly with one or more other devices via one or more direct communication links (not shown). Examples of direct communication links may include Wi-Fi Direct, BLUETOOTH®, wired, and/or, and other P2P group connections. The control system 135, local computing device 120, and/or remote computing device 140 in these examples may communicate according to the WLAN radio and baseband protocol including physical and medium access control (MAC) layers from Institute of Electrical and Electronics Engineers (IEEE) 802.11, and its various versions including, but not limited to, 802.11b, 802.11g, 802.11a, 802.11n, 802.11ac, 802.11ad, 802.11ah, etc. In other implementations, other peer-to-peer connections and/or ad hoc networks may be implemented within security and automation system 100.

In an example, local computing device 120 and remote computing device 140 may be custom computing entities configured to interact with sensor units 110 via network 125, and in some examples, via server 155. In other examples, local computing device 120 and remote computing device 140 may be general purpose computing entities such as a personal computing device, for example, a desktop computer, a laptop computer, a netbook, a tablet personal computer (PC), a control system, an indicator panel, a multi-site dashboard, an iPod®, an iPad®, a smart phone, a mobile phone, a personal digital assistant (PDA), and/or any other suitable device operable to send and receive signals, store and retrieve data, and/or execute procedures. The local computing device 120 may include memory, a processor, an output, a data input and a communication component. The processor may be a general purpose processor, a Field Programmable Gate Array (FPGA), an Application Specific Integrated Circuit (ASIC), a Digital Signal Processor (DSP), and/or the like. The processor may be configured to retrieve data from and/or write data to the memory. The memory may be, for example, a random access memory (RAM), a memory buffer, a hard drive, a database, an erasable programmable read only memory (EPROM), an electrically erasable programmable read only memory (EEPROM), a read only memory (ROM), a flash memory, a hard disk, a floppy disk, cloud storage, and/or so forth. In some examples, the local computing device 120 may include one or more hardware-based components (e.g., DSP, FPGA, ASIC) and/or software-based features (e.g., computer code stored at the memory and executed at the processor, a set of processor-readable instructions that may be stored at the memory and executed at the processor) associated with executing an application, such as, for example, receiving and displaying data from sensor units 110.

The processor of the local computing device 120 may be operable to control operation of the output of the local computing device 120. The output may be a television, a liquid crystal display (LCD) monitor, a cathode ray tube (CRT) monitor, speaker, tactile output device, and/or the like. In some examples, the output may be an integral component of the local computing device 120. Similarly, the output may be directly coupled with the processor. For example, the output may be the integral display of a tablet and/or smart phone. In some examples, an output component may include, for example, a High Definition Multimedia Interface™ (HDMI) connector, a Video Graphics Array (VGA) connector, a Universal Serial Bus™ (USB) connector, a tip, ring, sleeve (TRS) connector, and/or any other suitable connector operable to couple the local computing device 120 to the output.

The remote computing device 140 may be a computing entity operable to enable a remote person to monitor the output of the sensor units 110. The remote computing device 140 may be functionally and/or structurally similar to the local computing device 120 and may be operable to receive data streams from and/or send signals to at least one of the sensor units 110 via the network 125. The network 125 may be the Internet, an intranet, a personal area network, a local area network (LAN), a wide area network (WAN), a virtual network, a telecommunications network implemented as a wired network and/or wireless network, etc. The remote computing device 140 may receive and/or send signals over the network 125 via wireless communication links 145 and server 155.

In some examples, the sensor units 110 may be sensors configured to conduct periodic or ongoing automatic measurements related to detecting an occurrence of an event. In some examples, the sensor units 110 may be configured to determine presence, occupancy, identity, and location based on a received request. Each sensor unit 110 may be capable of sensing multiple identification and/or location determining parameters, or alternatively, separate sensor units 110 may monitor separate identification and/or location determining parameters. For example, one sensor unit 110 may determine an identity of a person, while another sensor unit 110 (or, in some examples, the same sensor unit 110) may detect an occupancy of and/or location of the person.

In some examples, the sensor units 110 may be separate from the control system 135 and may be positioned at various locations throughout the house or the property. In other examples, the sensor units 110 may be integrated or collocated with other house and/or building automation system components, home appliances, and/or other building fixtures. For example, a sensor unit 110 may be integrated with a doorbell or door intercom system, or may be integrated with a front entrance light fixture. In other examples, a sensor unit 110 may be integrated with a wall outlet and/or switch. In other examples, the sensor units 110 may be integrated and/or collocated with the control system 135 itself. In some examples, each of the sensor units 110, control system 135, and/or local computing device 120 may include a speaker unit, a microphone unit, and/or a camera unit, among other things.

In some cases, a premises may be monitored by the control system 135 and/or sensor units 110. In some examples, the control system 135 may include sensor units 110 such that the control system 135 may directly receive signals (e.g., motion sensed, entry/exit detected) associated with the premises. One or more sensor units 110 may be capable of sensing an alarm event. Some sensor units 110 may be capable of sensing multiple occupancy parameters, or alternatively, separate sensor units may monitor separate occupancy parameters. For example, one sensor unit may be a motion sensor, while another sensor unit may detect security parameters by monitoring vibration or audio. In some cases, sensor units 110 may additionally monitor alternate security and occupancy parameters, for example by monitoring heartbeat or breathing. In some examples, occupancy may be detected by any one of a motion sensor, audio sensor, radio frequency identification (RFID) sensor, video camera, light-break sensor, or a combination thereof. In some examples, the sensor units 110 may be separate from the control system 135, and may be positioned at various locations, also referred to herein as zones, throughout a premises. In other examples, the sensor units 110 may be integrated or collocated with other security and automation system components. For example, a sensor unit 110 may be integrated with a wall, door, window for detecting entry and/or exit of a person relative to the premises. In other examples, the sensor units 110 may be integrated or collocated with the control system 135 itself.

In some cases, the control system 135 in communication with the sensor units 110 may receive sensor data associated with at least one sensor of a home automation system. For instance, the control system 135 may receive, at a microphone included in the control system 135 of the security and automation system, an audio signal from a zone within a premises. In some examples, the control system 135 may receive a trigger to perform a security function associated with a home automation system. In some examples, the security function may be instructions to arm or disarm a premises (i.e., activate alarm parameters) or transmitting a notification (e.g., transmitting a notification to a user or an emergency personnel). In some examples, after receiving an audio signal (e.g., from a smoke sensor), the control system 135 may determine one or more settings associated with the security and automation system 100. In some examples, the security and/or automation system 100 may be referred to as a home automation system.

In some security and/or automation systems, having more sensors and/or actuators may increase coverage for security purposes and may increase automation features as well. Having additional components (e.g., sensors and/or actuators) may increase installation costs or may increase maintenance costs or both. For example, if the sensors or actuators are battery-operated, the user may have to replace batteries at regularly intervals to ensure functionality is maintained. In other examples, if the sensors or actuators are coupled with a power source or a wired network, that may increase installation costs considerably. Systems, devices, and techniques for incorporating some functionality into the control system 135 (e.g., in the hub device 160 and/or in one or more user interfaces 165) at a premises and thereby reduce a quantity of other components in the system 100.

In some examples, the control system 135 may determine, at a first processor of the control system 135, that a set of characteristics of the audio signal satisfies a threshold. For example, the control system 135 may determine whether a sound of an alarm (e.g., a smoke alarm) satisfies a threshold (e.g., has a certain characteristic). The control system 135 may transmit a notification of an event in a zone of the premises based on determining that the set of characteristics of the audio signal satisfies the threshold. For example, the control system 135 may send a notification to a user indicating that an alarm has been triggered. Additionally or alternatively, the control system 135 may determine that the alarm is associated with a life-safety event and may transmit a notification to an emergency personnel based on determining that the alarm is associated with a life-safety event.

In some examples, a sensor unit 110 may be an example of a camera configured to monitor a zone of a premises. In some cases, the camera may be configured to monitor a zone within a field of view of the camera. In one example, a user of the system 100 may initiate a mode which includes the monitoring (such as an "away" mode). The system 100 may detect an occupancy in the zone, for example using the camera or another sensor unit 110 (e.g., a motion sensor). The system 100 may determine an action to take at the security and automation system based on detecting the occupancy (e.g., a presence of a person). The system 100 may generate a notification (e.g. an audiovisual notification) to a user based on determining an occupancy. The techniques described herein may utilize a control panel to receive an audio signal from a sensor and transmitting an alert, among other benefits.

Figure 2:
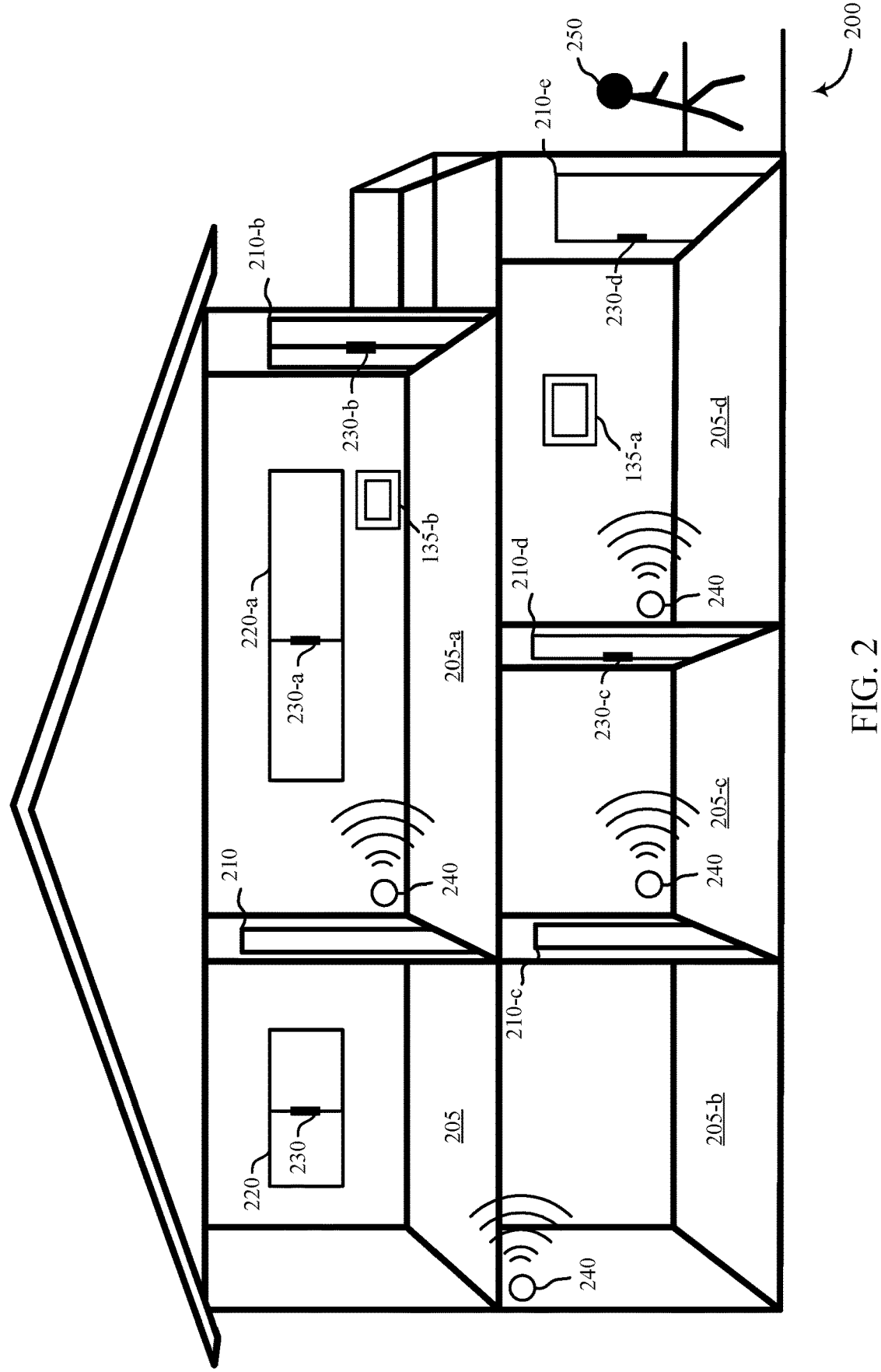
FIG. 2 illustrates an example of a security and automation environment that supports techniques for audio detection at a control system in accordance with aspects of the present disclosure.

FIG. 2 illustrates an example of a security and automation environment 200 that supports techniques for audio detection at a control system in accordance with aspects of the present disclosure. The security and automation environment 200 may include one or more aspects of the security and automation system 100, as described in FIG. 1. The security and automation environment 200 may include one or more zones 205, one or more sensor units 240, one or more access points 210 and 220, one or more lock components 230, and control system 135-a. Each of the zones 205 may be associated with a particular room of a house, hotel, office, commercial building, etc.

The control system 135-*a* may include one or more examples of a control system 135 as described in FIG. 1. The control system 135-*a* may include a hub device, one or more user interfaces, for example, an interactive panel mounted on a wall of the security and automation environment 200. In some examples, the control system 135-*a* may be in direct communication via wired or wireless communication links with the one or more sensor units 240, or may receive sensor data from the one or more sensor units 240. The sensor units 240 may be integrated with a wall, door, window and be configured for detecting entry and/or exit of a person relative to a zone 205. One or more sensor units 240 may include one or more examples of sensor units 110 as described in FIG. 1. The control system 135-*b* may include one or more examples of a control system 135 as described in FIG. 1. The control system 135-*b* may be a hub in wired or wireless communication with a smart home system panel. The control system 135-*b* may include a user interface and may provide the same functionalities as the control system 135-*a*. The control system 135-*a* may also be in direct communication via wired or wireless communication links with the one or more lock components 230. In some cases, the control system 135-*a* may transmit a signal to the one or more lock components 230 to change a state of the lock components 230. Additionally or alternatively, the control system 135-*a* or the control system 135-*b* may transmit a notification to a user and/or an emergency personnel based on determining an alarm event.

Zone 205 may be a bedroom of a structure (e.g., home). The zone 205 may also include interior walls and exterior walls. The zone 205 may also include a floor and a ceiling. In some examples, the zone 205 may include one or more sensors units 240 (not shown) or devices installed, mounted, or integrated with the zone 205. For example, the zone 205 may have a motion sensor installed or mounted on a wall of the zone 205. The motion sensor may detect whether the zone 205 is occupied and report collected sensor data to the control system 135-*a* or the control system 135-*b*. In some examples, the zone 205 may include an access point 210 and an access point 220. The access point 210 may have a door or be an open entry. Alternatively, the access point 220 may be a window. In some examples, the zone 205 may include a lock component 230. The access point 220 may include lock component 230, while the access point 210 may be absent of a lock component 230, e.g., when the access point 210 is an open entry-way.

Additionally or alternatively, the security and automation environment 200 may include a zone 205-*a*. Similarly, the zone 205-*a* may be a bedroom, living room, etc., of a structure. In some examples, the zone 205-*a* and the zone 205 may be separated at least partly from each other via walls of the security and automation environment 200. Similarly, the zone 205-*a* may include one or more sensor units 240 installed, mounted, or integrated with the zone 205-*a*. For example, the zone 205-*a* may have a camera/video sensor installed or mounted on a wall of the zone 205-*a*. The camera/video sensor may capture still images or record video of a field-of-view of the zone 205-*a*. In some cases, one or more sensor units 240 of the zone 205-*a* may transmit captured images or recorded video to the control system 135-*a* for further processing.

The zone 205-*a* may also include access points 210 and 210-*b*, and an access point 220-*a*. In some examples, the zone 205 and the zone 205-*a* share the access point 210. Similarly, the access points 220-*a* and 210-*b* may include lock components 230-*a* and 230-*b*. The lock component 230-*a* and lock component 230-*b* may, in some examples, adjust a state of the access point 220-*a* and the access point 210-*b*. For example, the access point 220-*a* may be a window and the lock component 230-*a* may be a locking mechanism that may lock or unlock the window. Similarly, the access point 210-*b* may be a sliding door to a patio. The lock component 230-*b* may provide access to the patio based on a state of the lock component 230-*b* (i.e., locked or unlocked). In some cases, the lock component 230-*a* and the lock component 230-*b* may adjust a state based on sensor data collected and identified by the sensor unit 240 of the zone 205-*a*. Alternatively, the lock component 230-*a* and the lock component 230-*b* may change a state based on instructions received from the control system 135-*a*. The zone 205-*a* may also include a sensor unit 240 including a carbon monoxide alarm or a smoke alarm or both. The sensor unit 240 may sound an alarm (e.g., t3/t4 alarm) and the control system 135-*b* and/or the control system 135-*a*. The control system 135-*a* or the control system 135-*b* may receive the alarm and may trigger a life-safety event alert. Upon identifying the alarm, the control system 135-*a* or the control system 135-*b* may send the alert to one or more monitoring personnel (e.g., emergency personnel). In some examples, a monitoring personnel may handle the life-safety event.

Zone 205-*b* may, similarly to the zone 205 and 205-*a*, include interior walls and/or exterior walls. The zone 205-*b* may also include a floor and a ceiling. In some examples, the floor of the zone 205-*b* may include one or more sensors integrated with it. For example, the floor may include pressure sensors to detect a person walking. In some examples, the one or more sensor units 240 may be integrated with the floor to detect a person and identify the detected person. The sensor units 240 may report the detection and identification of the person in zone 205-*b* to the control system 135-*a* for further processing. In some cases, the zone 205-*b* may include an access point 210-*c*, which may be an open entry access point with no lock component. The zone 205-*b* may include one or more sensor units 240 to monitor one or more conditions of the zone 205-*b*. For example, the one or more sensor units 240 may monitor a temperature of the zone 205-*b*, motion at the zone 205-*b*, sound at the zone 205-*b*, light at the zone 205-*b*, etc.

Zone 205-*c* may, similarly to the zones 205 through 205-*b*, include interior walls and/or exterior walls. The zone 205-*c* may also include a floor and a ceiling. Additionally, the zone 205-*c* may include one or more sensor units 240. The one or more sensor units 240 of zone 205-*c* may be installed, mounted, or integrated within zone 205-*c*. Zone 205-*c* may include an access point 210-*c* that is shared with zone 205-*b*. The zone 205-*c* may also include an access point 210-*d* shared with zone 205-*d*. Zone 205-*d* may, likewise to the zones 205 through 205-*c*, include interior walls and/or exterior walls. The zone 205-*d* may also include a floor and a ceiling. Additionally, the zone 205-*d* may include one or more sensor units 240, an access point 210-*d* that is shared with the zone 205-*c*. The zone 205-*d* may also include an access point 210-*e*. The access point 210-*e* may be a main entry point to the structure of the security and automation environment 200. The access point 210-*e* may include a lock component 230-*d*. The one or more sensor units 240 of the zone 205-*d* may be installed, mounted, or integrated within the zone 205-*d*. For example, the lock component 230-*d* may be a doorbell camera. The control system 135-*a* may be located within the zone 205-*d*. In some examples, the zone 205-*d* may be an entry room (e.g., foray room of a home).

In some examples, the security and automation environment 200 may determine a person within a range of an access point based on sensor data received from one or more sensor units 240. Based on determining that the person is within the range of the access point, the control system 135-a may identify the person. In some examples, identifying the person may be based on a device carried by the person. For example, the device may be a Global Positioning System (GPS) tracking device worn or carried by the person. The GPS tracking device may include a small security hardware device (e.g., fob, token, charm). In some examples, the GPS tracking device may include an RFID mid-range device, or near-field communication (NFC) device. Additionally or alternatively, the identifying may be based on bio-recognition (e.g., fingerprint, voice, facial). In some examples, a person may speak a verbal message (e.g., password) at the lock component 230-d that may include a microphone in addition to a doorbell camera. The verbal message may be recorded and transmitted to the control system 135-a for analysis. For example, the control system 135-a may perform voice processing to identify that the verbal message was spoken by an authorized individual of the structure. As a result, the control system 135-a may transmit instructions to the lock component 230-d to change a state from locked to unlocked.

Some examples, of the security and automation environment 200 may determine operation of an access point (e.g., access point 210 through 210-e and/or access point 210 through 210-a). In some examples, one or more sensor units 240 in communication with the control system 135-a may determine whether an access point is operated from an exterior side or an interior side. As such, the control system 135-a may control a state of one or more of the lock components 230-a through 230-d or a feature of a home automation system based on the determined operation of the access point.

In some examples, determining whether the access point is operated from the exterior side or the interior side may include operating at least one touch sensor (e.g., capacitive touch). In some examples, determining whether the access point is operated from the exterior side or the interior side may be based on proximity detection. In some examples, determining whether the access point is operated from the exterior side or the interior side may be based on geo-location data transmitted by a device carried by the person. Determining whether the access point is operated from the exterior side or the interior side may include operating at least one motion sensor. In some cases, determining whether the access point is operated from the exterior side or the interior side may include operating at least one mechanical button or switch. In some examples, one or more sensor units 240 may wirelessly transmit sensor data associated with the access point to the control system 135-a. The control system 135-a may analyze and determine whether the access point is operated from the exterior side or the interior side based on the analysis of the sensor data. In some examples, the control system 135-a and/or one or more lock components 230 may suspend an alarm based on determining that sensor data from a sensor unit 240 indicates that the person 250 has interacted with an interior side of a lock component at an access point (e.g., when the security and automation environment 200 is not armed according to an "away" mode).

Additionally or alternatively, the control system 135-b may identify a person at an access point based on a GPS tracking device which may include a small security hardware device (e.g., fob, token, charm) in combination with the knocking sequence. In some examples, the GPS tracking device may include an RFID mid-range device, or NFC device. In some cases, the person may unlock or lock an access point via an application running on a mobile device carried by the person. The application may be installed and in communication with a security system executing on the control system 135-a.

In some examples, the security and automation environment 200 may determine when a person (i.e., person 250) has exited a home. For example, the control system 135-a and/or one or more of the lock components 230 may receive sensor data from one or more of the sensor units 240 dispersed throughout zones 205 through 205-d. In some examples, the control system 135-a and/or one or more of the lock components 230 through 230-d may include sensor units 240 such that the control system 135-a and/or lock components 230 through 230-d may directly receive signals (e.g., motion sensed, entry/exit detected) associated with the structure. Each sensor unit 240 may be capable of sensing multiple occupancy parameters, or alternatively, separate sensor units 240 may monitor separate occupancy parameters. For example, one sensor unit 240 may be a motion sensor, while another sensor unit 240 may detect security parameters by monitoring vibration or audio. In some cases, sensor units 240 may additionally monitor alternate security and occupancy parameters, for example by monitoring heartbeat or breathing. In some examples, occupancy may be detected by any one of a motion sensor, audio sensor, RFID sensor, video camera, light-break sensor, or a combination thereof.

In some examples, a user may arm the security and automation environment 200 to a first mode (e.g., "away" mode) for intrusion detection. If the security and automation environment 200 is armed according to a second mode, the security and automation environment 200 may detect occupancy. For example, the security and automation environment 200 may utilize the sensors 240 to determine intrusion or occupancy. In some examples, one or more microphones (included in sensor units 240 and/or the control system 135-a) and sound processing unit may remain on standby listening to audio in the security and automation environment 200. In some examples, a digital sound processor (included in sensor units 240 or the control system 135-a) may detect a unique sound and may attempt to match the sound to a known list of sounds. If the unique sound matches one or more of the known list of sounds, the security and automation environment 200 may determine that a set of characteristics associated with the sound satisfies a criterion (e.g., an event threshold). As depicted herein, the security and automation environment 200 may determine whether a person 250 is walking up to an access point based on sensor data received from one or more sensor units 240. In some examples, the control system 135-a may determine that the sound captured by one or more sensor units 240 match with a list of "wake up" sounds. In some examples, the control system 135-a may determine that the sound captured by one or more sensor units 240 satisfies one or more sound matching criteria (e.g., an event threshold). In such cases, the digital sound processor may initiate a process involving additional central processing unit (CPU) resources (e.g., more CPU intensive process) on the digital sound processor or on a separate CPU.

In some examples, the CPU may match the recorded sound clip against a learned model to verify and classify the sound. For example, the control system 135-a in combination with additional servers may determine whether an audio signal is associated with an event (e.g., an intrusion or occupancy). In some examples, intrusion may be classified by human speech, door opening sound, footsteps, glass break, etc. In some examples, occupancy may be classified by human speech footsteps, water running, doors opening, babies crying, etc. In some instances, the control system 135-*a* and/or the control system 135-*b* may classify an audio signal based on one or more characteristics of the audio signal. That is, the sensor units 240 in combination with the control system 135-*a* and/or the control system 135-*b* may classify the audio signal as occupancy or intrusion based on a set of characteristics of the audio signal satisfying a threshold. Events classified as intrusion may be sent to the control system 135-*a* for security purposes (in case where the sensor unit 240 classifies the sound as an intrusion). Events classified as occupancy may be handled for non-monitoring purposes. In some examples, the control system 135-*a* may trigger an event for monitoring and for emergency services if an audio signal is categorized as intrusion. Additionally or alternatively, the control system 135-*a* may trigger an event for home automation features if the audio signal is categorized as occupancy.

The sensor units 240 may be separate from the control system 135-*a* and/or one or more of the lock components 230 through 230-*d*, and may be positioned at various locations in zones 205 through 205-*d*. In other examples, the sensor units 240 may be integrated or collocated with other security and automation system components (e.g., smart home appliances, lighting fixtures, smart outlets and/or switches). After receiving the sensor data, the control system 135-*a*, the control system 135-*b* and/or one or more of the lock components 230 through 230-*d* may analyze the sensor data.

In some cases, the control system 135-*a* and/or one or more of the lock components 230 through 230-*d* in communication with one or more sensor units 240 may determine to trigger a security action associated with a home automation system. In some examples, the security action may be instructions to arm a structure or property. After receiving the instructions, the control system 135-*a* may determine one or more settings associated with the security and automation environment 200. The one or more setting may include instructing the lock component 230 through 230-*a* to adjust a state. For example, control system 135-*a* may transmit instructions to lock components 230 through 230-*a* to change to a locked state. In some examples, the control system 135-*a* and/or one or more lock components 230 may identify an event associated with an access point of the structure based on the sensor data. The control system 135-*a* and/or one or more lock components 230 may determine a state of a lock component of an access point based on the event, and modify a state of the lock component. For example, the control system 135-*a* and/or one or more lock components 230 may detect person 250 exiting the property, and based on detecting person 250 exiting the property, the control system 135-*a* and/or one or more lock components 230 may automatically initiate a function of the home automation system. In some examples, initiating the function is performed autonomous of a user input received at a control panel, a doorbell camera, and/or a lock at an access point.

In some examples, the control system 135-*a* in communication with one or more sensor units 240 may detect an occurrence of an event associated with a structure. In some examples, an event may include a presence of a person within a threshold distance of the structure. In one example, the occurrence of the event may be within a structure (e.g., home). In another example, the occurrence of the event may be within a predetermined boundary outside of the structure. The control system 135-*a* may detect that person 250 in within a threshold distance from a home based on received sensor data associated with an entry/exit access point, the control system 135-*a* may then parse sensor data from one or more other sensors located at the structure to determine whether an occupancy can be detected (e.g., another person within the home). If the control system 135-*a* determines that no occupancy is present, the control system 135-*a* may automatically initiate the action at one or more devices associated with the security and automation system. In one example, the control system 135-*a* may transmit instructions to lock components 230 through 230-*d* to change a state. In some cases, the control system 135-*a* may automatically initiate transmitting instructions to lock components 230 through 230-*d* to change a state regardless of detecting occupancy at the home.

If the control system 135-*a* detects presence of a person 250 outside the home but determines that no occupancy is present, the control system 135-*a* may automatically initiate changes to one or more devices within the security and automation system. For example, the control system 135-*a* may initiate a potential unwanted visitor detection event. In some instances, the control system 135-*a* may also initiate a deter mode. As part of the deter mode, the control system 135-*a* may turn on an outside light near an outdoor camera or near a sound detection source. Additionally or alternatively, the control system 135-*a* may randomly turn on lights throughout the home to emulate occupancy. The control system 135-*a* may further play sounds (such as dog barking and television sounds) to emulate occupancy.

In some examples, the control system 135-*a* in communication with one or more sensor units 240 may receive sensor data from at least one sensor associated with the home automation system based on the exit event. In some examples, the presence may be detected by actions performed in or outside a structure, or by detecting occupants at the structure and subsequently the occupants exiting the structure. In an example, the at least one sensor may be linked to an access point (e.g., door sensor or window sensor) which may detect when a door or window to a structure (e.g., residence) is opened and when a person exits the structure. In some examples, a person may be a sole occupant of the structure, or may join other occupants currently present at the structure.

The control system 135-*a* in communication with one or more sensor units 240 may determine an occupancy at the location of the structure based on the sensor data. In some examples, a structure or property may include a motion sensor, heartbeat sensor, breathing sensor, vibration sensor, or any other known occupancy detection means, to detect the presence of a person at or near the structure. In some examples, occupancy may alternatively be manually inputted by a person using a local computing device such as a smartphone, or may be automatically detected by a location sensor integrated with the local computing device or by a communication between the local computing device and another component (e.g., control panel). In some examples, occupancy may be determined based on sensor data indicating that there is movement in the kitchen, or that a smartphone signal is being detected in a bedroom. In some examples, the detected occupancy may be communicated to a remote computing device, such as a central security operating station or a personal computing device of a third party caller, where the occupancy may be displayed, for example in the form of a list, or in the form of a map of the structure or property.

In some examples, the control system 135-a in communication with one or more sensor units 240 may confirm an identity associated with an occupant at the location of structure based on the determined occupancy. In some examples, a person's identity may be determined based on identifying the location of a portable electronic device, belonging to a person associated with the structure, through GPS. Additionally or alternatively, an identity of a person may be confirmed using a retinal scanner, a fingerprint scanner, a voiceprint sensor, a camera calibrated to identify facial structure, a GPS receiver or a input device (e.g., a keypad) into which a user may input a personal identification number (PIN) or any other known identification detection means to detect the occupancy of a person and to determine the person's identity at or near a structure or property, for example, at a lock component located outside of the structure.

In some examples, the sensor data may include data received from a sensor unit 240 in contact with an access point, a sensor unit 240 in or in contact with a doorbell camera, a sensor unit 240 associated with an exterior of the home, a sensor unit 240 within the home, a camera, a motion sensor, a control panel, or a combination thereof. In some cases, the control system 135-a may transmit the instructions after a predetermined duration. For example, in cases where the person 250 exits the home and returns before the predetermined duration lapses, the control system 135-a will not have to initiate an action. In some examples, the control system 135-a and/or one or more lock components 230 may delay an alarm based on determining that sensor data from a sensor unit indicates that the person 250 has interacted with an interior side of a lock component at an access point.

In some examples, the one or more sensor units 240 in communication with the lock components 230 through 230-d may determine whether an access point is completely closed before the lock components 230 through 230-d adjust a state (e.g., transition from unlocked to locked). In some cases, the security and automation environment 200 may determine whether an access point is completely closed based on received sensor data from one or more sensor units 240 integrated with an access point. The one or more sensor units 240 that may be integrated with an access point, for determining whether the access point is completely closed, may include an open and close magnet sensor, an accelerometer sensor, a light sensor, a laser for detecting a position of an access point, or a separate computing device, or a combination thereof.

In some examples, the sensor units 240 may include a hinge sensor installed or mounted with a hinge or a portion of an access point. As a result, the sensor units 240 may determine movement of the access point (e.g., movement from a closed position to an open position, or movement from one open position to another open position). The sensor units 240 may also include, for example, a potentiometer, an electrostatic sensor, a piezoelectric sensor, or a magnetic sensor. In some cases, two sensor units 240 may be assigned to an access point, for instance a first sensor unit 240 may be a hinge sensor and a second sensor unit 240 may be a motion sensor. The two sensor units 240 may be used to confirm that the access point is moved and/or that a person, has moved through the opening (e.g., doorway) associated with the access point.

In some examples, the control system 135-a may determine whether to notify a person associated with the security and automation environment 200 based on received sensor data. For example, the control system 135-a may notify a person when a security event is detected. Additionally or alternatively, the control system 135-a may notify a person when an action is initiated. In some examples, control system 135-a may notify an emergency personnel when a life-safety event is detected. In some examples, notifying a person may include transmitting and/or broadcasting a message notifying the person regarding an action at the security and automation system. The message may include a verbal message or a written message. For example, a verbal message may be an automated message transmitted to a device associated with a person. Alternatively, the verbal message may be broadcasted at the control system 135-a. In some examples, a written message may be transmitted to device of a person. For example, a short message service (SMS) message, an email, a notification message, etc. The written message may, additionally or alternatively, be displayed at the control system 135-a. In some cases, the notifying may be transmitted and/or broadcasted automatically by the control system 135-a. The notifying may also be transmitted and/or broadcasted based on person and/or system preferences. In some examples, the notifying may be transmitted and/or broadcasted based on preconfigured settings. Alternatively, the notifying may be transmitted and/or broadcasted based on received input via a device or at the control system 135-a by a person or a received authorization.

In one example, a user may desire to receive an alert when a security event and/or a life-safety event is detected. Additionally or alternatively, a user may desire to receive an alert when an intrusion is detected. For instance, a homeowner may want to know when a person is detected near a structure. Thus, the present systems and methods provide the means for detecting events and initiating action in response to detecting events.

Figure 3:
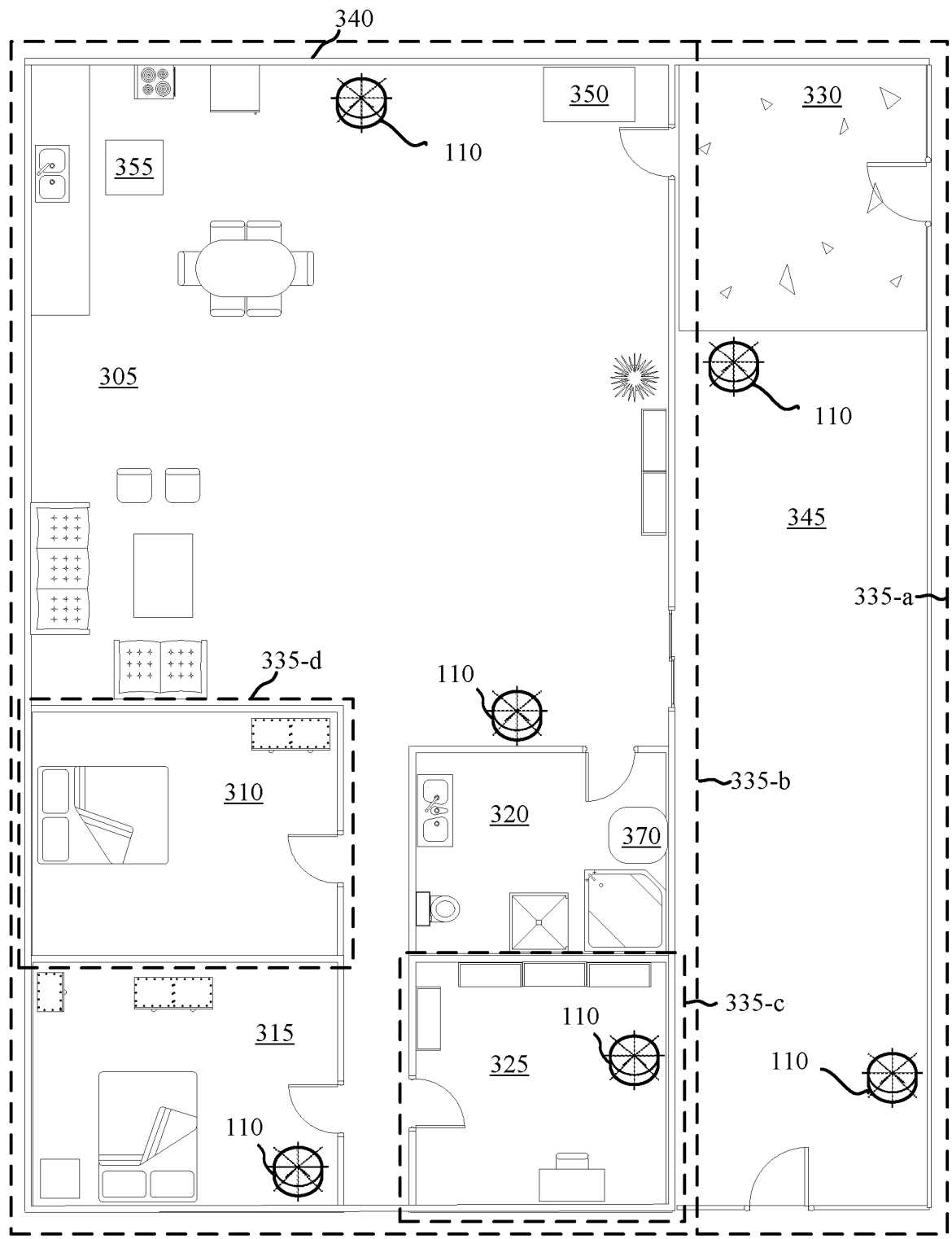
FIG. 3 illustrates a schematic diagram of an example of a home with a home automation system that supports techniques for audio detection at a control system in accordance with aspects of the present disclosure.

FIG. 3 illustrates a schematic diagram of an example of a home 300 with a home automation system that supports techniques for audio detection at a control system in accordance with aspects of the present disclosure.

The home 300 includes a building 340 and a yard 345. The building 340 includes rooms 305, 310, 315, 320, and 325 and the yard 345 includes a porch 330. Several sensor units 110 are distributed about the home 300 and are in communication with the security and/or automation system 350. The sensor units 110 may be an example of one or more aspects of the sensor units 110 of FIG. 1. The size, location, number, and design of the home 300 is merely illustrative. Furthermore, the home may be any other type of building or property. Other examples may include more or less rooms and sensor units 110, additional security and/or automation system 350 that may be integrated with a different part of the premises.

In the example of FIG. 1, the home 300 has four boundaries 335-a, 335-b, 335-c, and 335-d. The boundary 335-a may be a virtual boundary around the property of the home 300. For example, a user of the security and/or automation system 350 may select a virtual boundary 335-a for monitoring. In this example, the security and/or automation system 350 monitors and controls various functionalities of the home within the boundary 335-a but not external to it. That is, the boundary 335-a separates an area that the security and/or automation system 350 monitors and controls from an area that it does not monitor or control. However, within the boundary 335-a, the security and/or automation system 350 may have different levels of control. For example, the boundary 335-a includes the building 340 but does not include the yard 345. In one example, the security and/or automation system 350 may restrict access to the building 340 while not restricting access to the yard 345. One example of the security and/or automation system 350 restricting access is to maintain the doors and windows to the building 340 in a locked state. The security and/or automation system 350 may unlock a portion of the building 340 to allow ingress or egress, for example, by authorized users.

In some examples, a control system of the security and/or automation system 350 that includes a user interface and/or a hub 370 in communication with the user interface of the security and/or automation system 350 may receive an audio signal from one or more sensors. The user interface may receive an audio signal from a smoke detector or a carbon monoxide detector. In one example, the smoke detector may be located in the office 325. The office 325 may also include a hub 370 in wireless communication with a user interface located at room 305. The hub 370 may receive an audio signal from the smoke detector or the carbon monoxide detector and may determine whether the audio signal satisfies a threshold. In some examples, the hub 370 may determine that the audio signal originates from a sensor positioned in the premises based on determining that the second set of characteristics satisfies an event threshold (e.g., one or more criteria). For instance, the hub 370 may determine that the audio signal originates from the smoke detector or the carbon monoxide detector or otherwise identify the audio signal based on matching the audio signal with one or more stored sound signatures or other sound matching criteria. If the audio signal satisfies a threshold, the hub may forward the audio signal to the user interface or servers for further processing.

In some examples, carbon monoxide or smoke detector at room 325 may sound an alarm (e.g., t3/t4 standard alarm). In some examples, a user interface (e.g., user interface at room 305) may pick up an audio signal and the user interface may trigger a life-safety event alert. The user interface may send the alert to a monitoring service. The monitoring service may then handle the life-safety event.

According to one or more aspects, a user interface and/or a hub 370 may include microphones and sound processing units. The microphones and sound processing units may remain on standby listening to audio in the building 340. For example, the user interface and/or a hub 370 may use a digital sound processor to detect a unique sound and may attempt to match the sound to a list of pre-identified sounds (smoke alarm or glass break). In some examples, the user interface may determine that an audio signal matches to a list of "wake up" sounds. For instance, the hub 370 may detect an audio signal at the room 320 and may determine that the audio signal matches footsteps (e.g., a user walking into room 320). If the audio signal does not match to a list of "wake up" sounds, the digital sound processor may initiate a more CPU intensive process on the digital sound processor or on a separate CPU. The CPU may match a recorded sound clip against an existing sound model to verify and classify the sound as a smoke alarm or a glass break or as unknown. In some examples, sounds classified as unknown may be stored for evaluation in improving classification. Sounds classified as a smoke alarm or a glass break may be classified as life-safety events and may be sent to a user interface. In some examples, the user interface may trigger an event to a cloud monitoring service.

According to one or more aspects, when enabled, the digital sound processor (included in the user interface or the hub 370 or both) may be configured to continuously monitor for sounds. In some examples, the digital sound processor may determine a loss of power at the user interface of the security and automation system. In such cases, the digital sound processor may activate a back-up power source based on determining the loss of power at the user interface. For instance, if the digital sound processor detects AC power loss, the digital sound processor may be configured to run on battery power and maintain listening capabilities using the back-up power source.

The boundaries 335-c and 335-d are illustrated as boundaries internal to the building 340. For example, the boundary 335-c includes an office room 325 and the boundary 335-d includes a bedroom 310. The security and/or automation system 350 may be able to control access to either of the rooms 310 and 325. In this particular example, the security and/or automation system 350 has no sensor units 110 in the bedroom 310 but does have at least one sensor unit 110 in the office 325. In other examples, other rooms and sensor units 110 may be used. In The security and/or automation system 350 may deactivate and reactivate sensor units 110 in various portions of the building 340 using the boundaries and based on requests from an authorized user. For example, an authorized user may deactivate the sensor units 110 in a room 310 using boundary 335-d. In some examples, the authorized user may configure the security and/or automation system 350 to refrain from detecting sounds and/or motion in the room 310.

Figure 4:
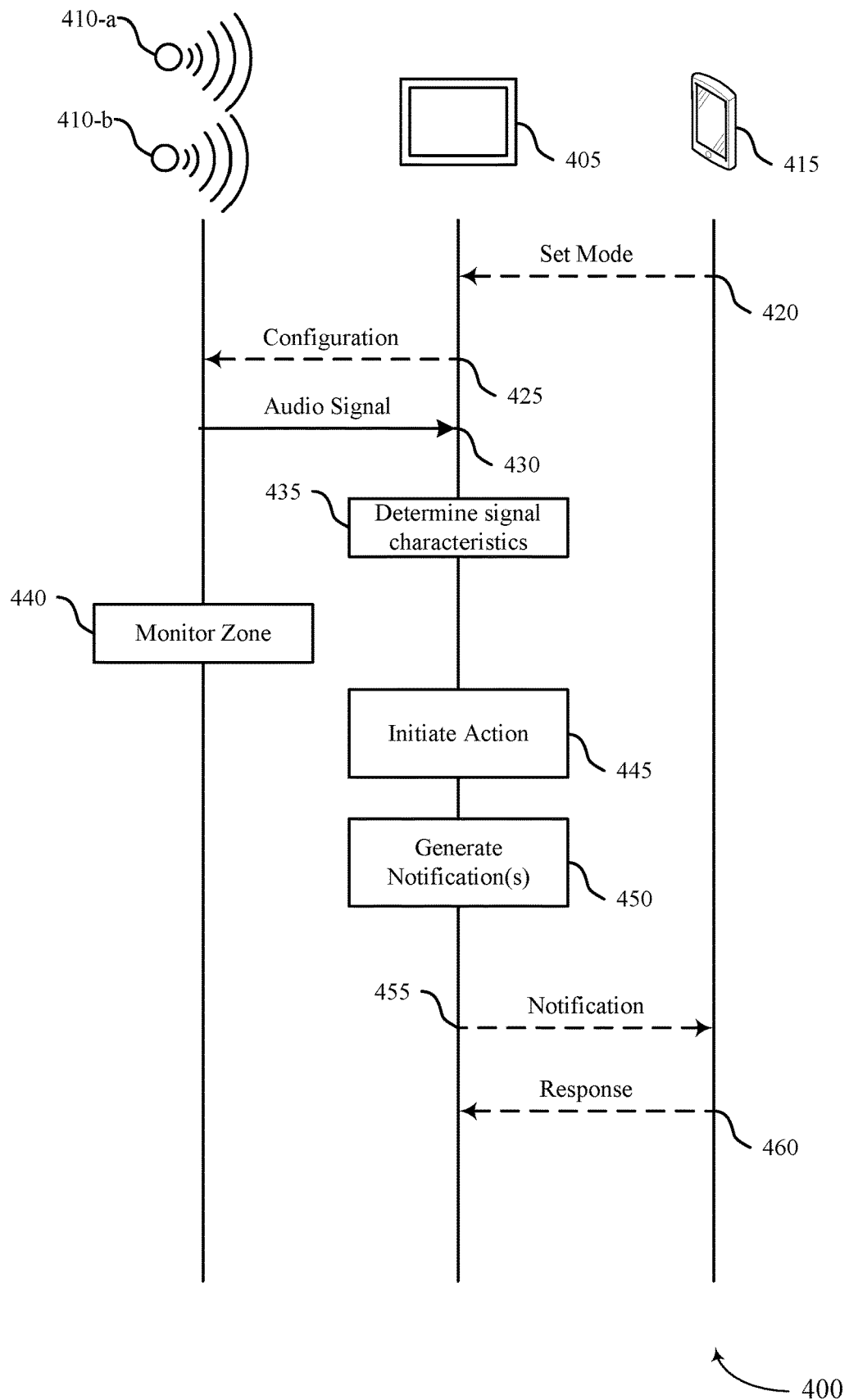
FIG. 4 illustrates an example of a process flow that supports techniques for audio detection at a control system in accordance with aspects of the present disclosure.

FIG. 4 shows a process flow 400 that supports techniques for audio detection at a control system in accordance with aspects of the present disclosure. In some examples, process flow 400 may implement aspects of the system 100. For example, the process flow 400 may include example operations associated with one or more of a control system 405, multiple sensor units 410 (410-a and 410-b), or a device 415, which may be examples of the corresponding devices described with reference to FIG. 1.

In the following description of the process flow 400, the operations between the control system 405, the sensor units 410, and the device 415 may be performed in a different order than the example order shown, or the operations performed by the control system 405, the sensor unit 410, and the device 415 may be performed in different orders or at different times. Some operations may also be omitted from the process flow 400, and other operations may be added to the process flow 400. In some examples, one or more operations of the process flow 400 performed by the control system 405 may additionally or alternatively be performed by a local computing device 120, a server 155, or a remote computing device 140 as described herein. The operations performed by the control system 405, the sensor unit 410, and the device 415 may support improvements to audio detection techniques, among other benefits.

In some examples, at 420 the device 415 may optionally transmit a signal to set a mode of a security and automation system. For example, a user associated with the device 415 may initiate a mode (e.g., an "away" mode) which includes an increased sensitivity for detecting individuals in the security and automation system. The device 415 may transmit an indication of the mode to the control system 405 (e.g., a hub of the control system 405, a user interface of the control system 405, or some combination of hubs and/or user interfaces of the control system 405). In some examples, at 425 the control system 405 may optionally transmit a configuration to the sensor units 410 based on the set mode. The configuration may include a setting to active a camera at the sensor unit 410 for detecting an intruder. Additionally or alternatively, at 425 the control system 405 may optionally transmit a configuration to the sensor units 410 and one or more nodes (not shown). The control system 405 may transmit one or more monitoring thresholds to cause at least one node of the security and automation system to initiate a recording of the audio signal when at least one of the one or more monitoring thresholds is satisfied.

At 430, the control system 405 may receive, at a microphone included in the control system of the security and automation system, an audio signal from a zone within the premises. In some cases, the control system 405 may be configured to communicate with nodes of the security and automation system using one or more wireless access technologies and one or more wired access technologies.

In some examples, the control system 405 may determine that the audio signal is an alarm output by a smoke detector positioned in the premises. As depicted herein, the sensor units 410 may include a smoke detector. In some cases, the control system 405 may transmit a life-safety alert based on determining that the audio signal is the alarm output by the smoke detector (not shown).

At 440, the sensor units 410 may monitor a zone of a premises associated with the security and automation system. The zone may be within a field of view of the camera of a sensor unit 410-a. The zone may include an exterior of a building on the premises, and may include a porch, a yard, a driveway, or any combination thereof. Alternatively, the zone may include an interior of the building on the premises. In some examples, the zone of the premises may include an area within a threshold distance from a building within the premises. In some examples, the zone monitored by the sensor unit 410 may overlap with one or more additional zones monitored by additional sensor units 410.

At 440, the control system 405 may determine an action to take at the security and automation system. In some examples, the control system 405 may detect in conjunction with the sensor units 110, a presence of a person based on monitoring the premises. The control system 405 may determine an action to take at the security and automation system based on detecting the presence of the person. In some examples, at 445 the control system 405 may determine to initiate the action at one or more devices associated with the security and automation system.

At 450, the control system 405 may generate one or more notifications based on determining the action to take at the security and automation system. At 455, the control system 405 may transmit a notification to the device 415. The notification may include a text message, a phone call, a push notification, etc. Additionally or alternatively, the second notification may be transmitted to a network operations center (e.g., for a provider of the security and automation system), an emergency response provider, etc. In some examples, at 460 the control system 405 may receive a response from the device 415. In some examples, the response may include instructions to notify police personnel or the network operation center.

The operations performed by the sensor units 410, the control system 405, and the device 415 may improve a likelihood that a security and automation system detect alarm event at a smoke detector or a glass break. Additionally or alternatively, the operations performed by the sensor units 410, the control system 405, and the device 415 may improve a likelihood that a security and automation system prevent theft of or damage to property at the premises, among other benefits.

Figure 5:
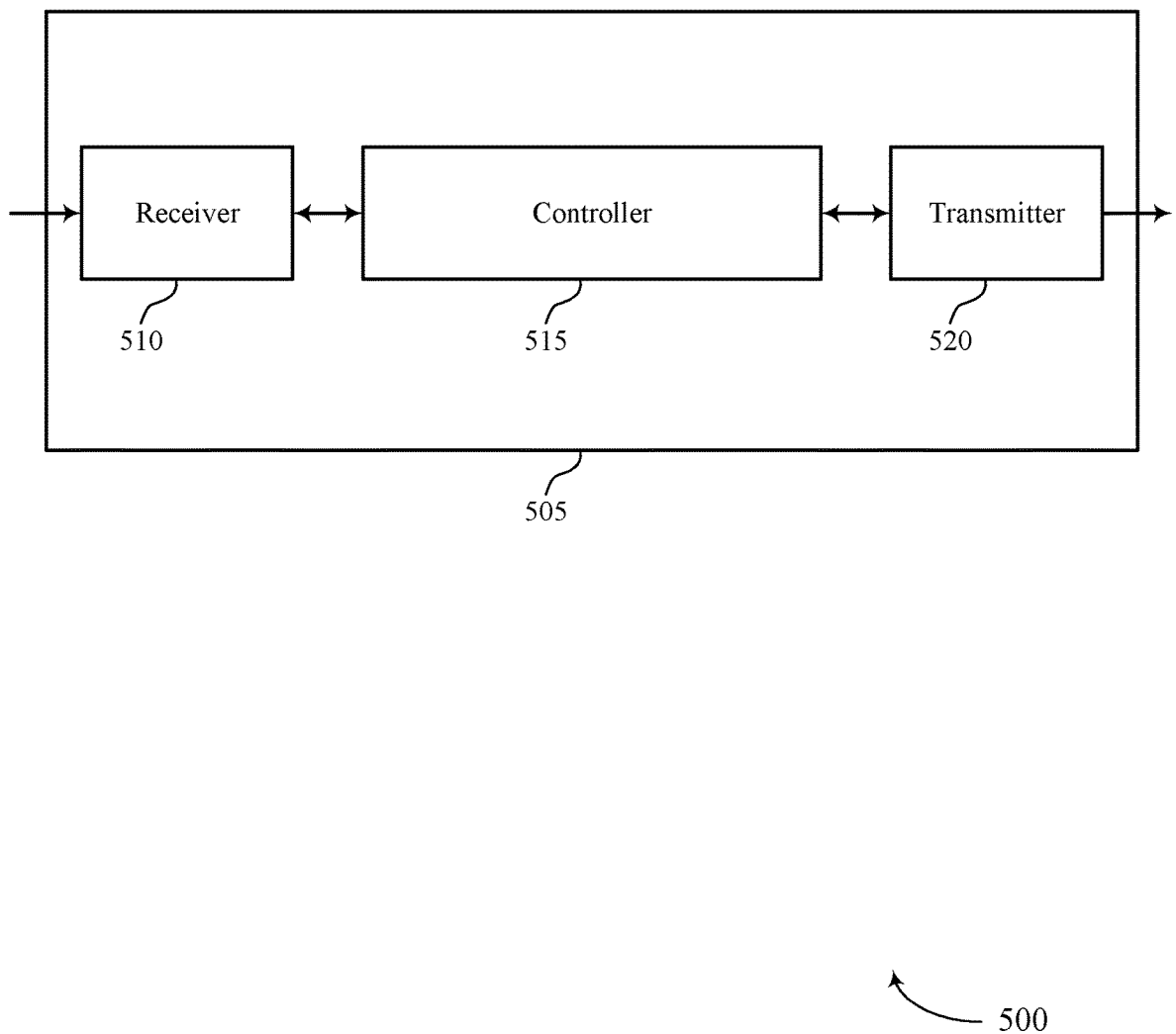
FIGS. 5 and 6 show block diagrams of devices that supports techniques for audio detection at a control system in accordance with aspects of the present disclosure.

FIG. 5 shows a block diagram 500 of a device 505 that supports techniques for audio detection at a control system in accordance with aspects of the present disclosure. The device 505 may be an example of aspects of a control system 135, a local computing device 120, a server 155, or a remote computing device 140 as described herein. The device 505 may include a receiver 510, a controller 515, and a transmitter 520. The device 505 may also include a processor. Each of these components may be in communication with one another (e.g., via one or more buses).

The receiver 510 may receive information such as packets, user data, or control information associated with various information channels (e.g., control channels, data channels, and information related to techniques for audio detection at a control system, etc.). Information may be passed on to other components of the device 505. The receiver 510 may be an example of aspects of the transceiver 820 described with reference to FIG. 8. The receiver 510 may utilize a single antenna or a set of antennas.

The controller 515 may receive, at a microphone included in a control system of the security and automation system, an audio signal from a zone within the premises, the control system configured to communicate with nodes of the security and automation system using one or more wireless access technologies and one or more wired access technologies, determine, at a first processor of the control system, that a set of characteristics of the audio signal satisfies a threshold, and transmit a notification of an event in the zone of the premises based on determining that the set of characteristics of the audio signal satisfies the threshold. The controller 515 may be an example of aspects of the controller 810 described herein.

The controller 515, or its sub-components, may be implemented in hardware, code (e.g., software or firmware) executed by a processor, or any combination thereof. If implemented in code executed by a processor, the functions of the controller 515, or its sub-components may be executed by a general-purpose processor, a DSP, an ASIC, an FPGA or other programmable logic device, discrete gate or transistor logic, discrete hardware components, or any combination thereof designed to perform the functions described in the present disclosure.

The controller 515, or its sub-components, may be physically located at various positions, including being distributed such that portions of functions are implemented at different physical locations by one or more physical components. In some examples, the controller 515, or its sub-components, may be a separate and distinct component in accordance with various aspects of the present disclosure. In some examples, the controller 515, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 520 may transmit signals generated by other components of the device 505. In some examples, the transmitter 520 may be collocated with a receiver 510 in a transceiver. For example, the transmitter 520 may be an example of aspects of the transceiver 820 described with reference to FIG. 8. The transmitter 520 may utilize a single antenna or a set of antennas.

Figure 6:
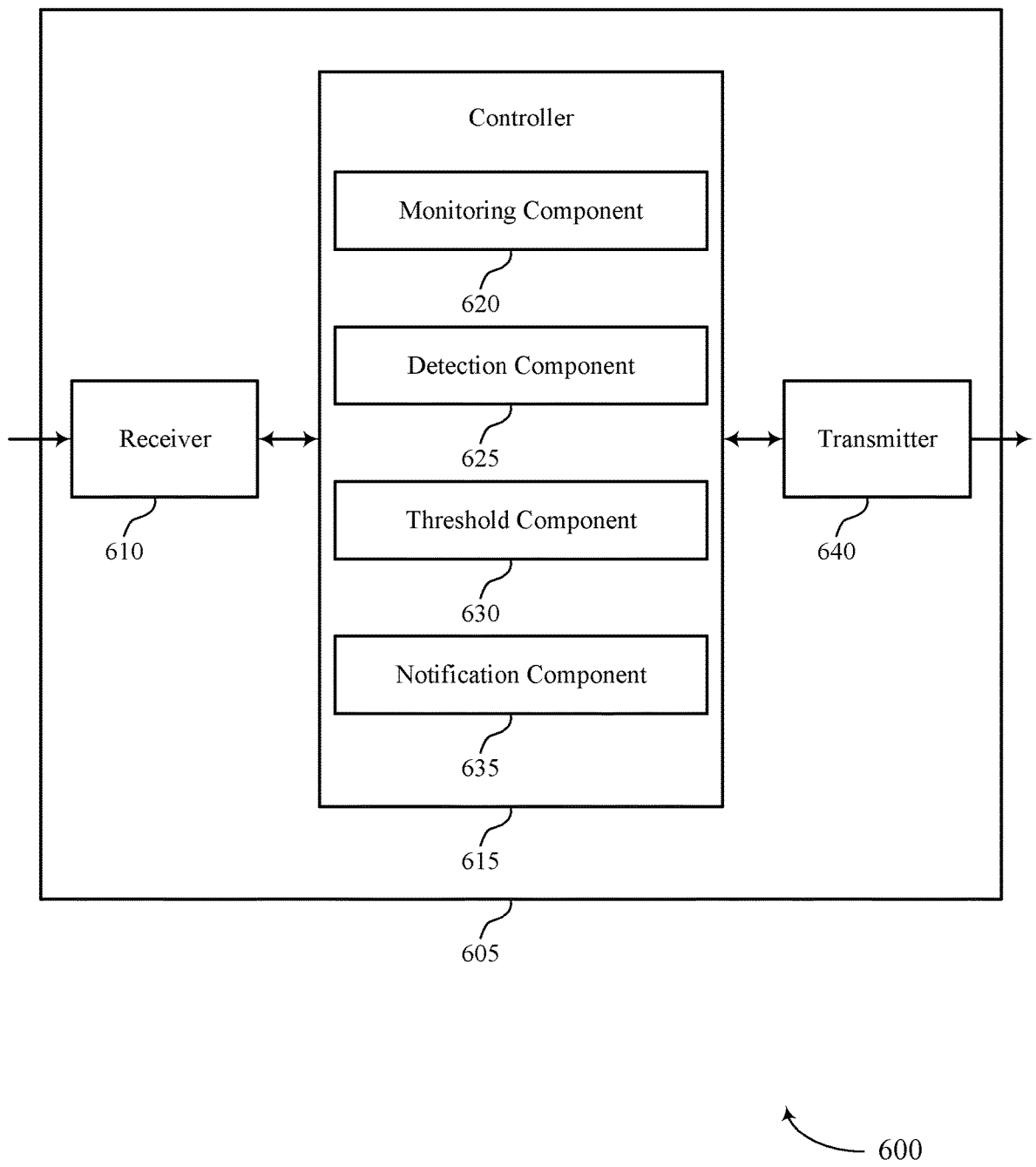

FIG. 6 shows a block diagram 600 of a device 605 that supports techniques for audio detection at a control system in accordance with aspects of the present disclosure. The device 605 may be an example of aspects of a device 505 a control system 135, a local computing device 115, 120, a server 155, or a remote computing device 140 as described herein. The device 605 may include a receiver 610, a controller 615, and a transmitter 640. The device 605 may also include a processor. Each of these components may be in communication with one another (e.g., via one or more buses).

The receiver 610 may receive information such as packets, user data, or control information associated with various information channels (e.g., control channels, data channels, and information related to techniques for audio detection at a control system, etc.). Information may be passed on to other components of the device 605. The receiver 610 may be an example of aspects of the transceiver 820 described with reference to FIG. 8. The receiver 610 may utilize a single antenna or a set of antennas.

The controller 615 may be an example of aspects of the controller 515 as described herein. The controller 615 may include a monitoring component 620, a detection component 625, a threshold component 630, and a notification component 635. The controller 615 may be an example of aspects of the controller 810 described herein.

The monitoring component 620 may receive, at a microphone included in a control system of the security and automation system, an audio signal from a zone within the premises, the control system configured to communicate with nodes of the security and automation system using one or more wireless access technologies and one or more wired access technologies. The detection component 625 may determine, at a first processor of the control system, that a set of characteristics of the audio signal satisfies a threshold.

The threshold component 630 may determine, at a second processor, that a second set of characteristics of the audio signal satisfies an event threshold based on determining that the set of characteristics satisfies the threshold. In some cases, transmitting the notification of the event is further based on determining that the second set of characteristics of the audio signal satisfies the event threshold, the second processor including a processor of a server in electronic communication with the control system using the one or more wireless access technologies or the one or more wired access technologies. The notification component 635 may transmit a notification of an event in the zone of the premises based on determining that the set of characteristics of the audio signal satisfies the threshold.

The transmitter 640 may transmit signals generated by other components of the device 605. In some examples, the transmitter 640 may be collocated with a receiver 610 in a transceiver. For example, the transmitter 640 may be an example of aspects of the transceiver 820 described with reference to FIG. 8. The transmitter 640 may utilize a single antenna or a set of antennas.

Figure 7:
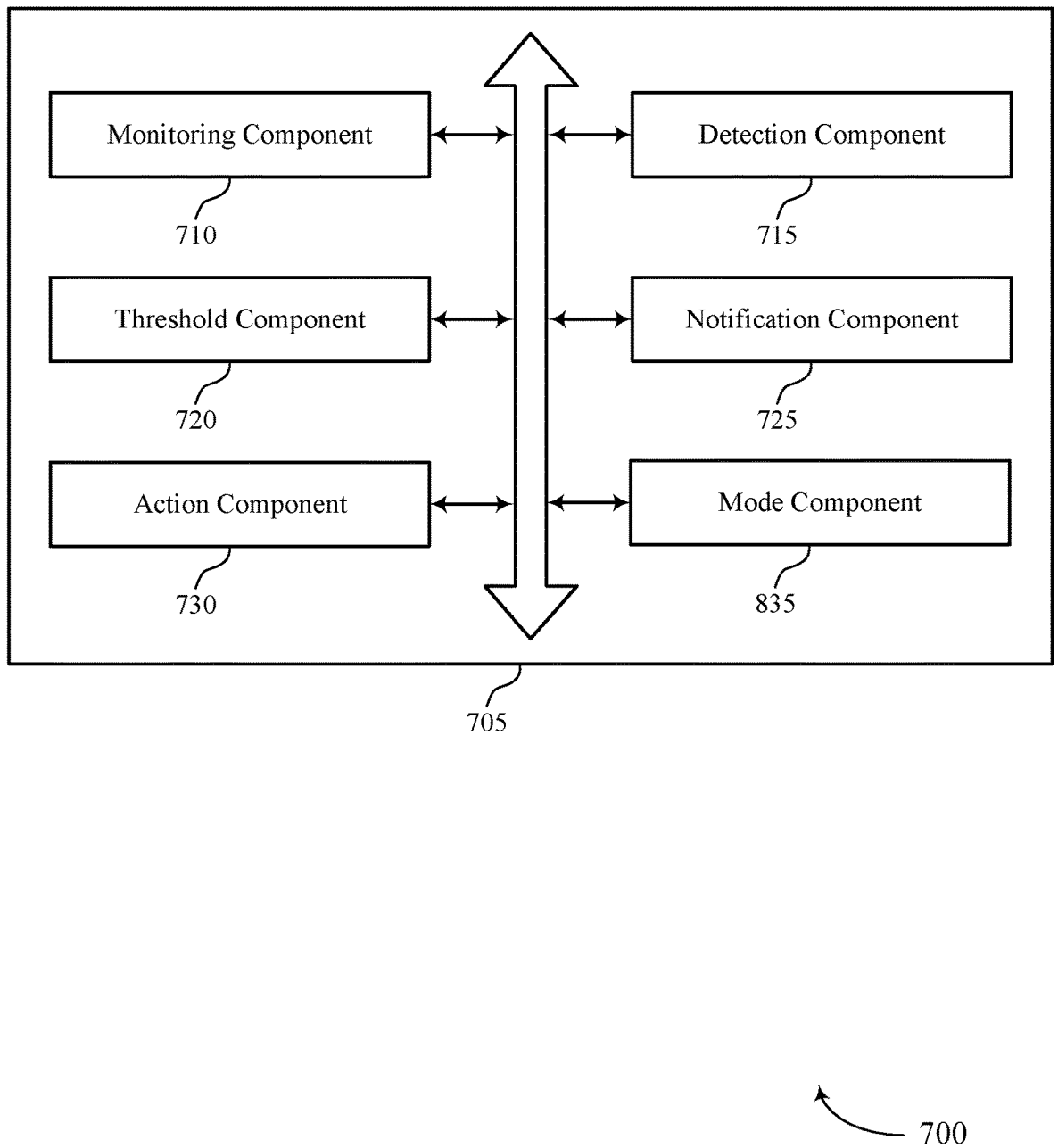
FIG. 7 shows a block diagram of a controller that supports techniques for audio detection at a control system in accordance with aspects of the present disclosure.

FIG. 7 shows a block diagram 700 of a controller 705 that supports techniques for audio detection at a control system in accordance with aspects of the present disclosure. The controller 705 may be an example of aspects of a controller 515, a controller 615, or a controller 810 described herein. The controller 705 may include a monitoring component 710, a detection component 715, a threshold component 720, a notification component 725, an action component 730, and a mode component 735. Each of these components may communicate, directly or indirectly, with one another (e.g., via one or more buses).

The monitoring component 710 may receive, at a microphone included in a control system of the security and automation system, an audio signal from a zone within the premises, the control system configured to communicate with nodes of the security and automation system using one or more wireless access technologies and one or more wired access technologies. In some cases, the processor of the control system includes a codec associated with the microphone.

The detection component 715 may determine, at a first processor of the control system, that a set of characteristics of the audio signal satisfies a threshold. The notification component 725 may transmit a notification of an event in the zone of the premises based on determining that the set of characteristics of the audio signal satisfies the threshold.

The threshold component 720 may determine, at a second processor, that a second set of characteristics of the audio signal satisfies an event threshold based on determining that the set of characteristics satisfies the threshold. In some cases, transmitting the notification of the event is further based on determining that the second set of characteristics of the audio signal satisfies the event threshold, the second processor including a processor of a server in electronic communication with the control system using the one or more wireless access technologies or the one or more wired access technologies.

In some examples, the detection component 715 may determine that the audio signal originates from a sensor positioned in the premises based on determining that the second set of characteristics satisfies the event threshold. In some examples, the detection component 715 may determine a type of the event detected by the sensor based on the second set of characteristics associated with the audio signal. In some cases, transmitting the notification is based on the type of the event.

In some examples, the detection component 715 may determine that the audio signal is an alarm output by a smoke detector positioned in the premises, the sensor including the smoke detector. In some cases, transmitting the notification may include transmitting a life-safety alert based on determining that the audio signal is the alarm output by the smoke detector.

In some examples, the monitoring component 710 may set, by the control system of the security and automation system, one or more monitoring thresholds to cause at least one node of the security and automation system to initiate a recording of the audio signal when at least one of the one or more monitoring thresholds is satisfied. In some examples, the monitoring component 710 may communicate the one or more monitoring thresholds to the nodes of the security and automation system using the one or more wireless access technologies and the one or more wired access technologies. In some cases, receiving the audio signal includes receiving the audio signal from the at least one node.

In some examples, the monitoring component 710 may detect, by a sensor, a presence of a person within a threshold distance of the premises based on monitoring the premises. The action component 730 may determine an action to take at the security and automation system based on detecting the presence of the person and initiate the action at one or more devices associated with the security and automation system.

In some examples, the monitoring component 710 may detect, by the sensor, at least one of an audio activity or a motion associated with the person within the premises based on the monitoring. In some examples, the detection component 715 may identify one or more characteristics of the presence based on detecting at least one of the audio activity or the motion. In some examples, the detection component 715 may determine a type of event at the premises based on the one or more identified characteristics of the presence. In some cases, the action is determined based the type of event.

In some cases, the type of event includes a life-safety event, a security event, or an occupancy event, or a combination thereof. In some cases, the action includes a reporting action or a deterrence action or both.

In some examples, the monitoring component 710 may detect, by the sensor, a motion associated with the person within the premises based on the monitoring. In some examples, the monitoring component 710 may determine a location of the motion associated with the person based on detecting the motion. In some cases, transmitting the notification of the event in the zone of the premises may include transmitting the determined location of the motion.

In some cases, the one or more devices may include at least one of a node of the security and automation system, a communication interface of the security and automation system, a remote device associated with an occupant of the premises, a device associated with a network operations center, a device associated with an emergency response provider, or any combination thereof.

The mode component 735 may determine that the security and automation system is operating in a first mode. In some examples, the monitoring component 710 may detect an event at the premises based on monitoring the premises. In some examples, the action component 730 may determine an action to take at the security and automation system based on detecting the event and determining that the security and automation system is operating in the first mode.

In some examples, the monitoring component 710 may determine a loss of power at the control system of the security and automation system. In some examples, the action component 730 may activate a back-up power source based on determining the loss of power at the control system. In some cases, receiving the audio signal from the zone within the premises is based on activating the back-up power source.

In some examples, the notification component 725 may receive, from at least a user, a response to the notification. In some examples, the action component 730 may perform an action based on receiving the response. In some cases, the notification includes a written message, a tone, a spoken announcement, an activation of a light, a flashing pattern of the light, a verbal message, or any combination thereof. In some cases, the response includes at least one of a command, a text message, a confirmation message, the verbal message, or any combination thereof.

In some examples, the monitoring component 710 may determine that the audio signal includes at least one of a signal originating from at least one of glass break, human speech, footsteps, interaction with a door, interaction with a window, running water, or any combination thereof, a signal originating from a sensor positioned in the premises, where the sensor comprises a smoke detection sensor, a carbon monoxide detection sensor, a camera sensor, a motion sensor, an occupancy sensor, a doorbell, a light, or any combination thereof. In some examples, the notification component 725 may transmit, to a central monitoring agency, a second notification indicating a life-safety alert based on determining that the set of characteristics of the audio signal satisfies the threshold.

Figure 8:
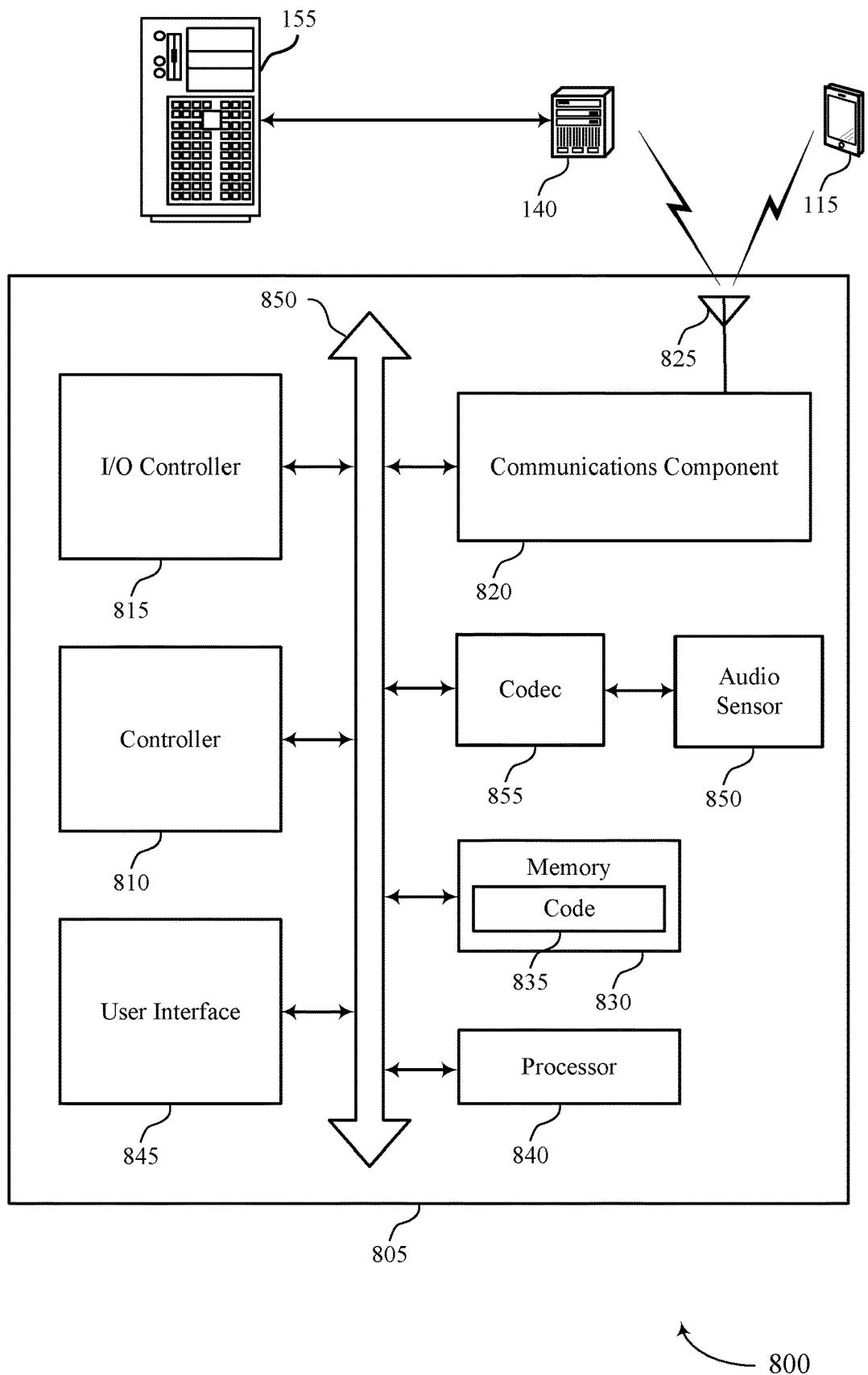
FIG. 8 shows a diagram of a system including a device that supports techniques for audio detection at a control system in accordance with aspects of the present disclosure.

FIG. 8 shows a diagram of a system 800 including a device 805 that supports techniques for audio detection at a control system in accordance with aspects of the present disclosure. The device 805 may be an example of or include the components of device 505, device 605, or a control system 135, a local computing device 115, 120, a server 155, or a remote computing device 140 as described herein. The device 805 may include components for bi-directional voice and data communications including components for transmitting and receiving communications, including a controller 810, an I/O controller 815, a communications component 820, an antenna 825, memory 830, a processor 840, a user interface 845, an audio sensor 850, and a codec 855. These components may be in electronic communication via one or more buses (e.g., bus 850).

In some cases, the device 805 may communicate with a remote computing device 140, and/or a remote server (e.g., a server 155). For example, one or more elements of the device 805 may provide a direct connection to the server 155 via a direct network link to the Internet via a POP (point of presence). In some cases, one element of the device 805 (e.g., one or more antennas, transceivers, etc.) may provide a connection using wireless techniques, including digital cellular telephone connection, Cellular Digital Packet Data (CDPD) connection, digital satellite data connection, and/or another connection.

Many other devices and/or subsystems may be connected to one or may be included as one or more elements of the system 800 (e.g., entertainment system, computing device, remote cameras, wireless key fob, wall mounted user interface device, cell radio device, battery, alarm siren, door lock, lighting system, thermostat, home appliance monitor, utility equipment monitor, and so on). In some cases, some or all of the elements shown in FIG. 8 may not be present to practice the present systems and methods. The devices and subsystems may also be interconnected in different ways from that shown in FIG. 8. In some cases, an aspect of the operations of the system 800 may be readily known in the art and are not discussed in detail in this disclosure.

The signals associated with the system 800 may include wireless communication signals such as radio frequency, electromagnetics, local area network (LAN), wide area network (WAN), virtual private network (VPN), wireless network (using 802.11, for example), 345 MHz, Z-WAVE®, cellular network (using 3G and/or Long Term Evolution (LTE), for example), and/or other signals. The radio access technology (RAT) of the system 800 may be related to, but are not limited to, wireless wide area network (WWAN) (GSM, CDMA, and WCDMA), wireless local area network (WLAN) (including user equipment (UE) BLUETOOTH® and Wi-Fi), WMAN (WiMAX), antennas for mobile communications, antennas for Wireless Personal Area Network (WPAN) applications (including RFID and UWB). In some cases, one or more sensors (e.g., motion, proximity, smoke, light, glass break, door, window, carbon monoxide, and/or another sensor) may connect to some element of the system 800 via a network using the one or more wired and/or wireless connections.

The controller 810 may receive, at a microphone included in a control system of the security and automation system, an audio signal from a zone within the premises, the control system configured to communicate with nodes of the security and automation system using one or more wireless access technologies and one or more wired access technologies, determine, at a first processor of the control system, that a set of characteristics of the audio signal satisfies a threshold, and transmit a notification of an event in the zone of the premises based on determining that the set of characteristics of the audio signal satisfies the threshold.

The I/O controller 815 may manage input and output signals for the device 805. The I/O controller 815 may also manage peripherals not integrated into the device 805. In some cases, the I/O controller 815 may represent a physical connection or port to an external peripheral. In some cases, the I/O controller 815 may utilize an operating system such as iOS®, ANDROID®, MS-DOS®, MS-WINDOWS®, OS/2®, UNIX®, LINUX®, or another known operating system. In other cases, the I/O controller 815 may represent or interact with a modem or a similar device. In some cases, the I/O controller 815 may be implemented as part of a processor. In some cases, a user may interact with the device 805 via the I/O controller 815 or via hardware components controlled by the I/O controller 815.

The communications 820 may communicate bi-directionally, via one or more antennas, wired, or wireless links as described above. For example, the transceiver 820 may represent a wireless transceiver and may communicate bi-directionally with another wireless transceiver. The transceiver 820 may also include a modem to modulate the packets and provide the modulated packets to the antennas for transmission, and to demodulate packets received from the antennas.

In some cases, the wireless device may include a single antenna 825. However, in some cases the device may have more than one antenna 825, which may be capable of concurrently transmitting or receiving multiple wireless transmissions.

The memory 830 may include RAM and ROM. The memory 830 may store computer-readable, computer-executable code 835 including instructions that, when executed, cause the processor to perform various functions described herein. In some cases, the memory 830 may contain, among other things, a basic input/output system (BIOS) which may control basic hardware or software operation such as the interaction with peripheral components or devices.

The processor 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In other cases, a memory controller may be integrated into the processor 840. The processor 840 may be configured to execute computer-readable instructions stored in a memory (e.g., the memory 830) to cause the device 805 to perform various functions (e.g., functions or tasks supporting techniques for audio detection at a control system).

The code 835 may include instructions to implement aspects of the present disclosure, including instructions to support audio detection. The code 835 may be stored in a non-transitory computer-readable medium such as system memory or other type of memory. In some cases, the code 835 may not be directly executable by the processor 840 but may cause a computer (e.g., when compiled and executed) to perform functions described herein.

The device 805 may optionally include a user interface 845. The user interface 845 may enable a user to interact with the device 805. In some cases, the user interface 845 may include an audio device, such as an external speaker system. In some cases the user interface 845 may include a keyboard, a mouse, a touchscreen, an external display device such as a display screen, or an input device (e.g., a remote control device interfaced with the user interface 845 directly or through the I/O controller 815).

The audio sensor 850 may be configured receive an audio signal and convert an audio signal into electrical signals for processing. An example of the audio sensor 850 may include a microphone.

The codec 855 may be an example of an audio coder-decoder associated with the microphone 850. The codec 855 may be configured to process, encode, or decode information received from the microphone 850. In some cases, the codec 855 may be referred to as a processor. In some examples, the codec 855 may compare one or characteristics of the audio signal detected by the microphone 850 with a first threshold. If the audio signal fails to satisfy the first threshold, the codec 855 may refrain from sending the audio signal to the processor 840. If the audio signal satisfies the first threshold at the coded 855, the codec 855 may transmit the audio signal to the processor 840 for additional processing. Such additional processing may include determining whether a set of characteristics of the audio signal satisfies a second threshold (e.g., determining whether the audio signal represents a smoke detector audio signal, a glass break, or some other type of sound). In such examples, the codec 855 may serve a thresholding function and may reduce processing for audio signals that do not satisfy the first threshold. Examples of the first threshold may include an amplitude (e.g., decibel) threshold of the audio signal, above which the audio signal is sent for additional processing and below which the audio signal is not processed further. The processor 840 and/or the remote computing device 140 may be configured to analyze the audio signal further and determine whether the audio signal satisfies an event threshold and whether to generate an alert.

Figure 9:
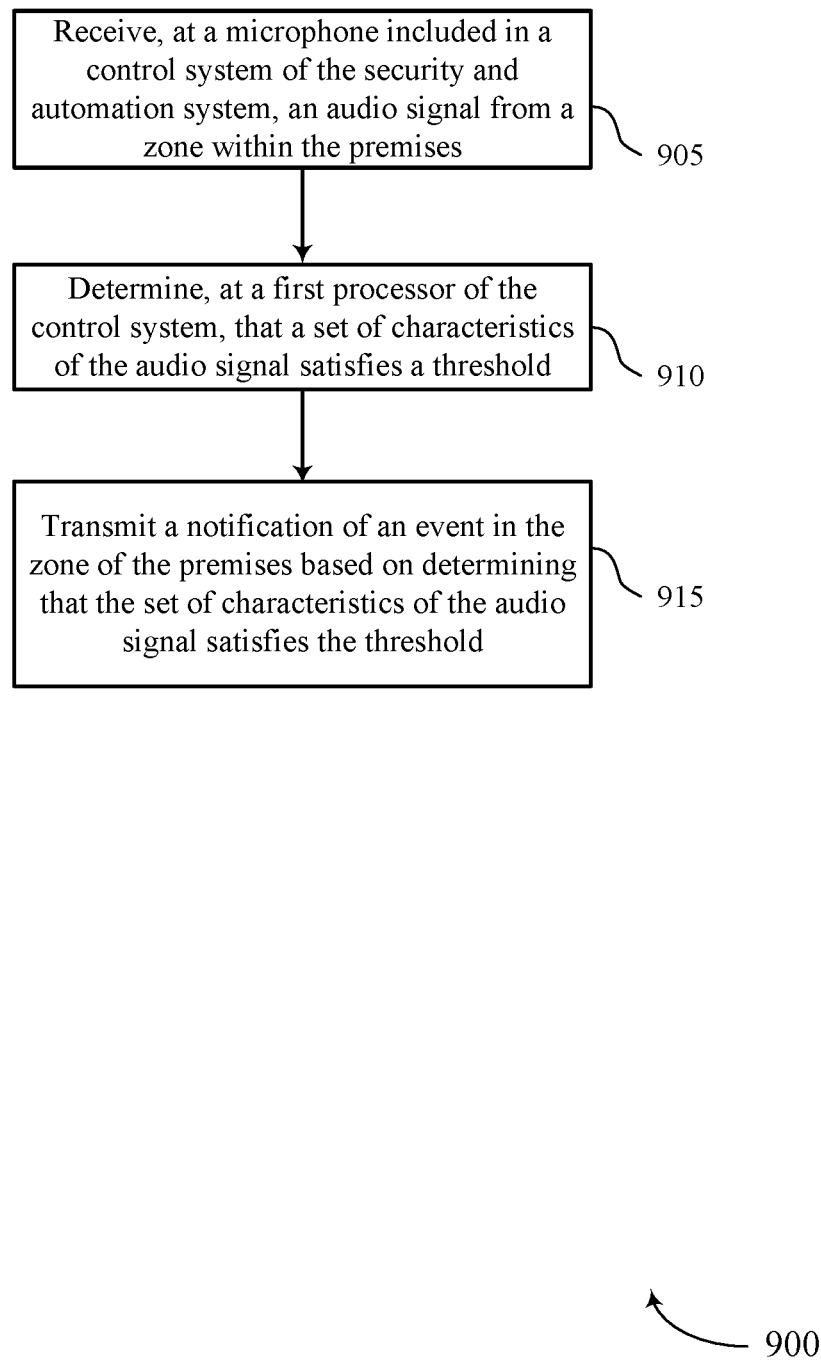
FIGS. 9 through 11 show flowcharts illustrating methods that supports techniques for audio detection at a control system in accordance with aspects of the present disclosure.

FIG. 9 shows a flowchart illustrating a method 900 that supports techniques for audio detection at a control system in accordance with aspects of the present disclosure. The operations of method 900 may be implemented by a device of a security and automation system (e.g., a control system 135, a local computing device 115, 120, a server 155, or a remote computing device 140) or its components as described herein. For example, the operations of method 900 may be performed by a controller as described with reference to FIGS. 5 through 8. In some examples, a device may execute a set of instructions to control the functional elements of the device to perform the functions described below. Additionally or alternatively, a device may perform aspects of the functions described below using special-purpose hardware.

At 905, the device may receive, at a microphone included in a control system of the security and automation system, an audio signal from a zone within the premises. In some cases, the control system may be configured to communicate with nodes of the security and automation system using one or more wireless access technologies and one or more wired access technologies. The operations of 905 may be performed according to the methods described herein. In some examples, aspects of the operations of 905 may be performed by a monitoring component as described with reference to FIGS. 5 through 8.

At 910, the device may determine, at a first processor of the control system, that a set of characteristics of the audio signal satisfies a threshold. The operations of 910 may be performed according to the methods described herein. In some examples, aspects of the operations of 910 may be performed by a detection component as described with reference to FIGS. 5 through 8.

At 915, the device may transmit a notification of an event in the zone of the premises based on determining that the set of characteristics of the audio signal satisfies the threshold. The operations of 915 may be performed according to the methods described herein. In some examples, aspects of the operations of 915 may be performed by a threshold component as described with reference to FIGS. 5 through 8.

Figure 10:
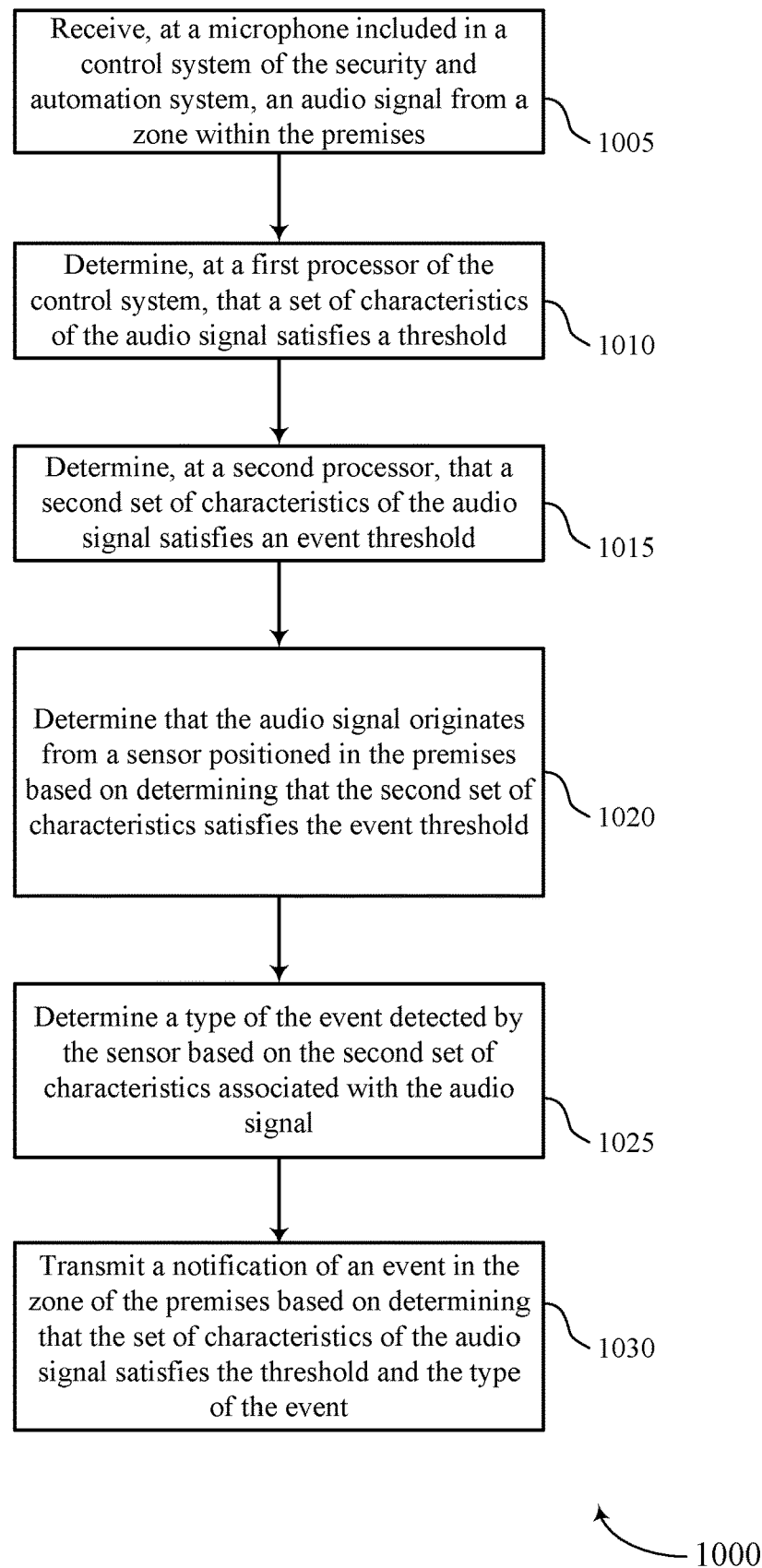

FIG. 10 shows a flowchart illustrating a method 1000 that supports techniques for audio detection at a control system in accordance with aspects of the present disclosure. The operations of method 1000 may be implemented by a device of a security and automation system (e.g., a control system 135, a local computing device 115, 120, a server 155, or a remote computing device 140) or its components as described herein. For example, the operations of method 1000 may be performed by a controller as described with reference to FIGS. 5 through 8. In some examples, a device may execute a set of instructions to control the functional elements of the device to perform the functions described below. Additionally or alternatively, a device may perform aspects of the functions described below using special-purpose hardware.

At 1005, the device may receive, at a microphone included in a control system of the security and automation system, an audio signal from a zone within the premises. In some cases, the control system may be configured to communicate with nodes of the security and automation system using one or more wireless access technologies and one or more wired access technologies. The operations of 1005 may be performed according to the methods described herein. In some examples, aspects of the operations of 1005 may be performed by a monitoring component as described with reference to FIGS. 5 through 8.

At 1010, the device may determine, at a first processor of the control system, that a set of characteristics of the audio signal satisfies a threshold. The operations of 1010 may be performed according to the methods described herein. In some examples, aspects of the operations of 1010 may be performed by a detection component as described with reference to FIGS. 5 through 8.

At 1015, the device may determine, at a second processor, that a second set of characteristics of the audio signal satisfies an event threshold based on determining that the set of characteristics satisfies the threshold. In some examples, transmitting the notification of the event may be further based on determining that the second set of characteristics of the audio signal satisfies the event threshold. In some cases, the second processor may include a processor of a server in electronic communication with the control system using the one or more wireless access technologies or the one or more wired access technologies. The operations of 1015 may be performed according to the methods described herein. In some examples, aspects of the operations of 1015 may be performed by a threshold component as described with reference to FIGS. 5 through 8.

At 1020, the device may determine that the audio signal originates from a sensor positioned in the premises based on determining that the second set of characteristics satisfies the event threshold. The operations of 1020 may be performed according to the methods described herein. In some examples, aspects of the operations of 1020 may be performed by the detection component as described with reference to FIGS. 5 through 8.

At 1025, the device may determine a type of the event detected by the sensor based on the second set of characteristics associated with the audio signal. The operations of 1025 may be performed according to the methods described herein. In some examples, aspects of the operations of 1025 may be performed by the detection component as described with reference to FIGS. 5 through 8.

At 1030, the device may transmit a notification of an event in the zone of the premises based on determining that the set of characteristics of the audio signal satisfies the threshold and the type of the event. The operations of 1030 may be performed according to the methods described herein. In some examples, aspects of the operations of 1030 may be performed by a notification component as described with reference to FIGS. 5 through 8.

Figure 11:
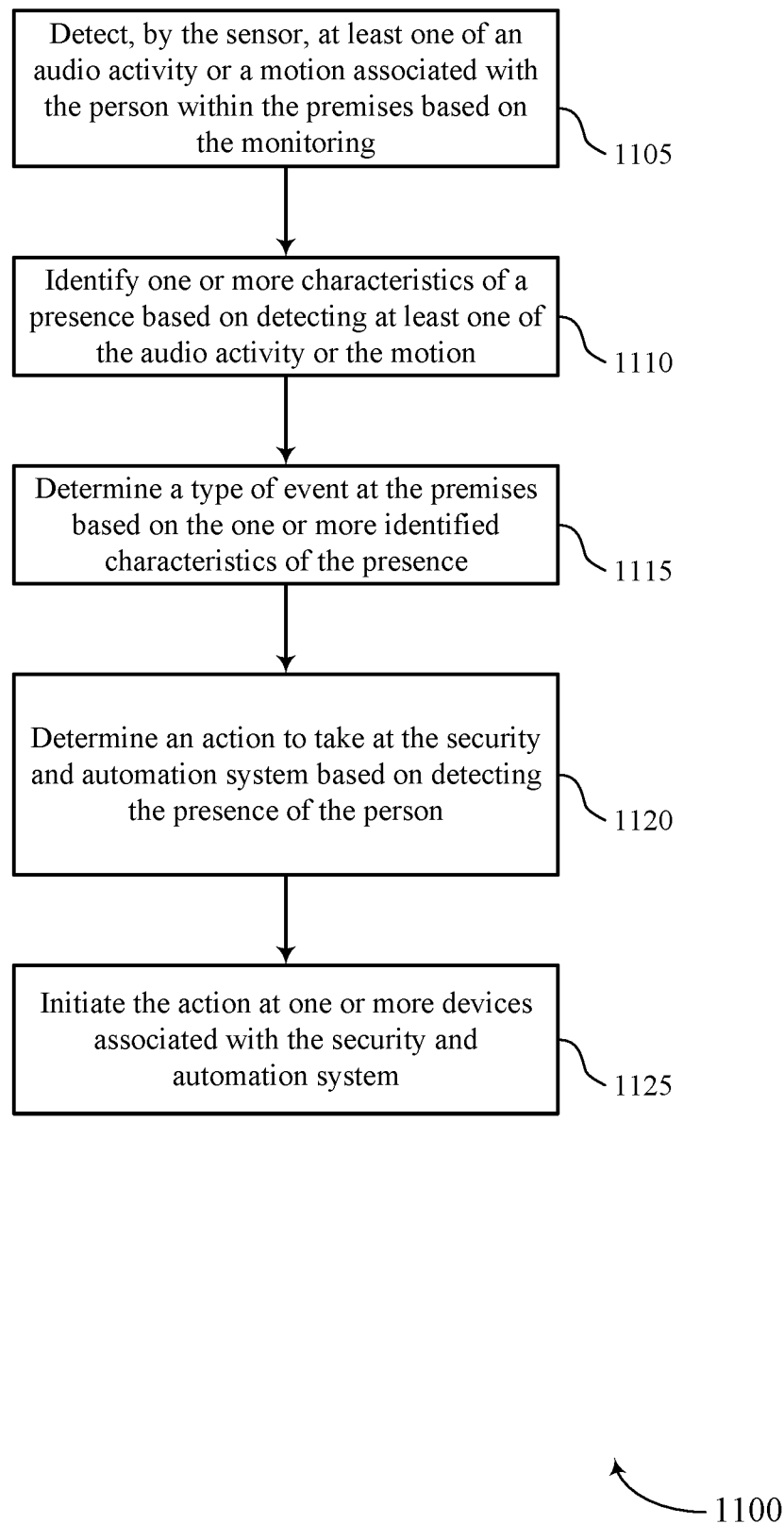

FIG. 11 shows a flowchart illustrating a method 1100 that supports techniques for audio detection at a control system in accordance with aspects of the present disclosure. The operations of method 1100 may be implemented by a device of a security and automation system (e.g., a control system 135, a local computing device 115, 120, a server 155, or a remote computing device 140) or its components as described herein. For example, the operations of method 1100 may be performed by a controller as described with reference to FIGS. 5 through 8. In some examples, a device may execute a set of instructions to control the functional elements of the device to perform the functions described below. Additionally or alternatively, a device may perform aspects of the functions described below using special-purpose hardware.

At 1105, the device may detect, by the sensor, at least one of an audio activity or a motion associated with the person within the premises based on the monitoring. The operations of 1105 may be performed according to the methods described herein. In some examples, aspects of the operations of 1105 may be performed by a detection component as described with reference to FIGS. 5 through 8.

At 1110, the device may identify one or more characteristics of the presence based on detecting at least one of the audio activity or the motion. The operations of 1110 may be performed according to the methods described herein. In some examples, aspects of the operations of 1110 may be performed by a detection component as described with reference to FIGS. 5 through 8.

At 1115, the device may determine a type of event at the premises based on the one or more identified characteristics of the presence. The operations of 1115 may be performed according to the methods described herein. In some examples, aspects of the operations of 1115 may be performed by the detection component as described with reference to FIGS. 5 through 8.

At 1120, the device may determine an action to take at the security and automation system based on detecting the presence of the person. The operations of 1120 may be performed according to the methods described herein. In some examples, aspects of the operations of 1120 may be performed by an action component as described with reference to FIGS. 5 through 8.

At 1125, the device may initiate the action at one or more devices associated with the security and automation system. The operations of 1125 may be performed according to the methods described herein. In some examples, aspects of the operations of 1125 may be performed by the action component as described with reference to FIGS. 5 through 8.

The detailed description set forth herein in connection with the appended drawings describes examples and does not represent the only instances that may be implemented or that are within the scope of the claims. The terms "example" and "exemplary," when used in this description, mean "serving as an example, instance, or illustration," and not "preferred" or "advantageous over other examples." The detailed description includes specific details for the purpose of providing an understanding of the described techniques. These techniques, however, may be practiced without these specific details. In some instances, known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and components described in connection with this disclosure may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, and/or state machine. A processor may also be implemented as a combination of computing devices, e.g., a combination of a DSP and a microprocessor, multiple microprocessors, one or more microprocessors in conjunction with a DSP core, and/or any other such configuration. An operating system utilized by the processor (or by I/O controller or another device described above) may be iOS®, ANDROID®, MS-DOS®, MS-WINDOWS®, OS/2®, UNIX®, LINUX®, or another known operating system.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In addition, any disclosure of components contained within other components or separate from other components should be considered exemplary because multiple other architectures may potentially be implemented to achieve the same functionality, including incorporating all, most, and/or some elements as part of one or more unitary structures and/or separate structures.

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can include RAM, ROM, EEPROM, flash memory, CD-ROM, DVD, or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed.

This disclosure may specifically apply to security system applications. This disclosure may specifically apply to automation system applications. In some cases, the concepts, the technical descriptions, the features, the methods, the ideas, and/or the descriptions may specifically apply to security and/or automation system applications. Distinct advantages of such systems for these specific applications are apparent from this disclosure.

The process parameters, actions, and steps described and/or illustrated in this disclosure are given by way of example only and can be varied as desired. For example, while the steps illustrated and/or described may be shown or discussed in a particular order, these steps do not necessarily need to be performed in the order illustrated or discussed. The various exemplary methods described and/or illustrated here may also omit one or more of the steps described or illustrated here or include additional steps in addition to those disclosed.

Furthermore, while various cases have been described and/or illustrated here in the context of fully functional computing systems, one or more of these exemplary cases may be distributed as a program product in a variety of forms, regardless of the particular type of computer-readable media used to actually carry out the distribution. The cases disclosed herein may also be implemented using software that perform tasks. Such software may include script, batch, or other executable files that may be stored on a computer-readable storage medium or in a computing system. In some cases, the software may permit and/or instruct a computing system to perform one or more of the exemplary cases disclosed here.

This description, for purposes of explanation, has been described with reference to specific cases. The illustrative discussions above, however, are not intended to be exhaustive or limit the present systems and methods to the precise forms discussed. Many modifications and variations are possible in view of the above teachings. The cases were chosen and described in order to explain the principles of the present systems and methods and their practical applications, to enable others skilled in the art to utilize the present systems, apparatus, and methods and various cases with various modifications as may be suited to the particular use contemplated.

What is claimed is:

1. A method for audio detection at a security and automation system associated with a premises, the method comprising:
receiving, at a microphone included in a control system of the security and automation system, an audio signal from a zone within the premises, the control system configured to communicate with nodes of the security and automation system using one or more wireless access technologies and one or more wired access technologies;
determining, at a first processor of the control system, that a first set of characteristics of the audio signal satisfies a first threshold;
in response to determining that the first set of characteristics satisfies the first threshold, automatically transmitting the audio signal from the first processor to a second processor without processing the audio signal relative to a second threshold at the first processor;
determining, at a second processor, that a second set of characteristics of the audio signal satisfies the second threshold based at least in part on determining that the first set of characteristics satisfies the first threshold, the second processor comprising a processor of a remote server in electronic communication with the control system using the one or more wireless access technologies or the one or more wired access technologies; and
transmitting a notification of an event in the zone of the premises based at least in part on determining that the first set of characteristics of the audio signal satisfies the first threshold.

2. The method of claim 1, wherein transmitting the notification of the event is further based at least in part on determining that the second set of characteristics of the audio signal satisfies the second threshold.

3. The method of claim 2, further comprising:
determining that the audio signal originates from a sensor positioned in the premises based at least in part on determining that the second set of characteristics satisfies the second threshold; and
determining a type of the event detected by the sensor based at least in part on
the second set of characteristics associated with the audio signal, wherein transmitting the notification is based at least in part on the type of the event.

4. The method of claim 3, wherein determining the type of the event further comprises:
determining that the audio signal is an alarm output by a smoke detector positioned in the premises, the sensor comprising the smoke detector, wherein transmitting the notification comprises transmitting a life-safety alert based at least in part on determining that the audio signal is the alarm output by the smoke detector.

5. The method of claim 1, wherein:
the processor of the control system comprises a codec associated with the microphone.

6. The method of claim 1, further comprising:
setting, by the control system of the security and automation system, one or more monitoring thresholds to cause at least one node of the security and automation system to initiate a recording of the audio signal when at least one of the one or more monitoring thresholds is satisfied; and
communicating the one or more monitoring thresholds to the nodes of the security and automation system using the one or more wireless access technologies and the one or more wired access technologies, wherein receiving the audio signal comprises receiving the audio signal from the at least one node.

7. The method of claim 1, further comprising:
detecting, by a sensor, a presence of a person within a threshold distance of the premises based at least in part on monitoring the premises;
determining an action to take at the security and automation system based at least in part on detecting the presence of the person; and
initiating the action at one or more devices associated with the security and automation system.

8. The method of claim 7, wherein detecting the presence of the person comprises:
detecting, by the sensor, at least one of an audio activity or a motion associated with the person within the premises based at least in part on the monitoring;
identifying one or more characteristics of the presence based at least in part on detecting at least one of the audio activity or the motion; and
determining a type of event at the premises based at least in part on the one or more characteristics of the presence, wherein the action is determined based at least in part on the type of event.

9. Method of claim 8, wherein:
the type of event comprises a life-safety event, a security event, or an occupancy event, or a combination thereof; and
the action comprises a reporting action or a deterrence action or both.

10. The method of claim 7, further comprising:
detecting, by the sensor, a motion associated with the person within the premises based at least in part on the monitoring; and
determining a location of the motion associated with the person based at least in part on detecting the motion, wherein transmitting the notification of the event in the zone of the premises comprises transmitting the location of the motion.

11. The method of claim 10, wherein:
the one or more devices comprise at least one of a node of the security and automation system, a communication interface of the security and automation system, a remote device associated with an occupant of the premises, a device associated with a network operations center, a device associated with an emergency response provider, or any combination thereof.

12. The method of claim 7, further comprising:
determining that the security and automation system is operating in a first mode;
detecting the event at the premises based at least in part on monitoring the premises; and
determining the action to take at the security and automation system based at least in part on detecting the event and determining that the security and automation system is operating in the first mode.

13. The method of claim 1, further comprising:
determining a loss of power at the control system of the security and automation system; and
activating a back-up power source based at least in part on determining the loss of power at the control system, wherein receiving the audio signal from the zone within the premises is based at least in part on activating the back-up power source.

14. The method of claim 1, further comprising:
receiving, from a user, a response to the notification; and
performing an action based at least in part on receiving the response.

15. The method of claim 14, wherein:
the notification comprises a written message, a tone, a spoken announcement, an activation of a light, a flashing pattern of the light, a verbal message, or any combination thereof; and
the response comprises at least one of a command, a text message, a confirmation message, the verbal message, or any combination thereof.

16. The method of claim 1, further comprising:
determining that the audio signal comprises at least one of a signal originating from at least one of glass break, human speech, footsteps, interaction with a door, interaction with a window, running water, or any combination thereof, a signal originating from a sensor positioned in the premises, wherein the sensor comprises a smoke detection sensor, a carbon monoxide detection sensor, a camera sensor, a motion sensor, an occupancy sensor, a doorbell, a light, or any combination thereof.

17. The method of claim 1, further comprising:
transmitting, to a central monitoring agency, a second notification indicating a life-safety alert based at least in part on determining that the first set of characteristics of the audio signal satisfies the first threshold.

18. An apparatus for audio detection at a security and automation system associated with a premises, the apparatus comprising:
a processor;
memory coupled with the processor; and
instructions stored in the memory and executable by the processor to cause the apparatus to:
receive, at a microphone included in a control system of the security and automation system, an audio signal from a zone within the premises, the control system configured to communicate with nodes of the security and automation system using one or more wireless access technologies and one or more wired access technologies;
determine, at a first processor of the control system, that a first set of characteristics of the audio signal satisfies a first threshold;
in response to determining that the first set of characteristics satisfies the first threshold, automatically transmit the audio signal from the first processor to a second processor without processing the audio signal relative to a second threshold at the first processor;
determine, at a second processor, that a second set of characteristics of the audio signal satisfies the second threshold based at least in part on determining that the first set of characteristics satisfies the first threshold, the second processor comprising a processor of a remote server in electronic communication with the control system using the one or more wireless access technologies or the one or more wired access technologies; and
transmit a notification of an event in the zone of the premises based at least in part on determining that the first set of characteristics of the audio signal satisfies the first threshold.

19. The apparatus of claim 18, wherein transmitting the notification of the event is further based at least in part on determining that the second set of characteristics of the audio signal satisfies the second threshold.

20. A non-transitory computer-readable medium storing code, the code comprising instructions executable by a processor of a security and automation system to:
receive, at a microphone included in a control system of the security and automation system, an audio signal from a zone within a premises, the control system configured to communicate with nodes of the security and automation system using one or more wireless access technologies and one or more wired access technologies;
determine, at a first processor of the control system, that a first set of characteristics of the audio signal satisfies a first threshold;
in response to determining that the first set of characteristics satisfies the first threshold, automatically transmitting the audio signal from the first processor to the second processor without processing the audio signal relative to a second threshold at the first processor;
determine, at a second processor, that a second set of characteristics of the audio signal satisfies the second threshold based at least in part on determining that the first set of characteristics satisfies the first threshold, the second processor comprising a processor of a remote server in electronic communication with the control system using the one or more wireless access technologies or the one or more wired access technologies; and
transmit a notification of an event in the zone of the premises based at least in part on determining that the first set of characteristics of the audio signal satisfies the first threshold.

* * * * *